(12) United States Patent
Dole

(10) Patent No.: US 7,090,259 B2
(45) Date of Patent: Aug. 15, 2006

(54) ANTI-MISMATCH OF NEAR-SIZED COUPLING SEGMENTS

(75) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 227 days.

(21) Appl. No.: 10/645,712

(22) Filed: Aug. 20, 2003

(65) Prior Publication Data

US 2004/0036291 A1    Feb. 26, 2004

Related U.S. Application Data

(62) Division of application No. 09/368,680, filed on Aug. 5, 1999, now Pat. No. 6,626,466.

(51) Int. Cl.
*F16L 17/00* (2006.01)
(52) U.S. Cl. .................... 285/367; 285/93; 285/112
(58) Field of Classification Search .................. 285/93, 285/112, 364–367, 420
See application file for complete search history.

(56) References Cited

U.S. PATENT DOCUMENTS

| | | | | |
|---|---|---|---|---|
| 1,967,467 A | * | 7/1934 | Damsel | 285/112 |
| 2,028,182 A | * | 1/1936 | Barnickol, Jr. | 285/112 |
| 2,862,728 A | | 12/1958 | Druschel et al. | |
| 3,020,068 A | * | 2/1962 | Costanzo | 285/55 |
| 3,189,969 A | | 6/1965 | Sweet | |
| 3,251,615 A | * | 5/1966 | Short, III | 285/112 |
| 3,966,237 A | * | 6/1976 | Thiessen | 285/112 |
| 4,209,891 A | | 7/1980 | Lamb et al. | |
| 4,471,979 A | * | 9/1984 | Gibb et al. | 285/373 |
| 4,601,495 A | | 7/1986 | Webb | |
| 4,609,209 A | | 9/1986 | Ralls | |
| 4,611,839 A | * | 9/1986 | Rung et al. | 285/367 |
| 4,639,020 A | | 1/1987 | Rung et al. | |
| 4,861,075 A | * | 8/1989 | Pepi et al. | 285/112 |
| 4,893,843 A | * | 1/1990 | DeRaymond | 277/616 |
| 4,896,902 A | | 1/1990 | Weston | |
| 4,940,261 A | | 7/1990 | Somers Vine | |
| 5,018,548 A | * | 5/1991 | McLennan | 137/315.23 |
| 5,058,931 A | * | 10/1991 | Bowsher | 285/112 |
| 5,188,397 A | | 2/1993 | Hynes | |
| 5,401,062 A | | 3/1995 | Vowles | |
| 5,603,508 A | * | 2/1997 | Dole et al. | 277/314 |
| 5,758,907 A | | 6/1998 | Dole et al. | |
| 6,076,861 A | * | 6/2000 | Ikeda | 285/112 |

* cited by examiner

*Primary Examiner*—Brian E. Glessner
*Assistant Examiner*—Carlos Lugo
(74) *Attorney, Agent, or Firm*—Abelman, Frayne & Schwab

(57) ABSTRACT

A series of successively sized segmented arcuate pipe couplings in which anti-mismatch members are provided to prevent the inadvertent connection of two different, but closely sized coupling segments together. The anti-mismatch features are provided on the ends of the arcuate coupling segments which (a) will nest when the proper coupling segments are brought together, but (b) will be in an interference non-nested relationship when a mismatch is attempted. This will prevent the fully bolt tightened connection of the size mismatched coupling segments, as well as a visual indication to a user that a size mismatch is being attempted.

13 Claims, 16 Drawing Sheets

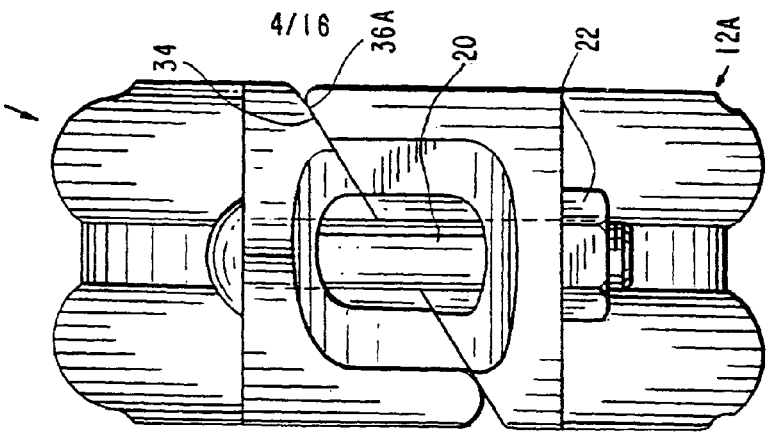
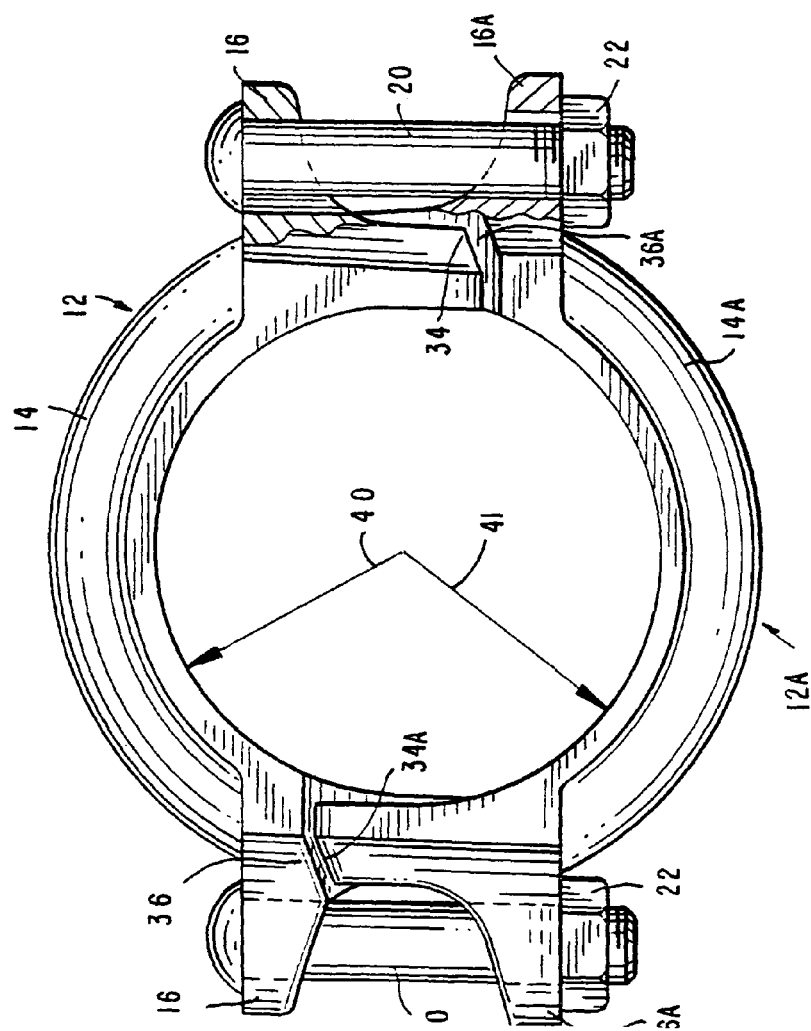

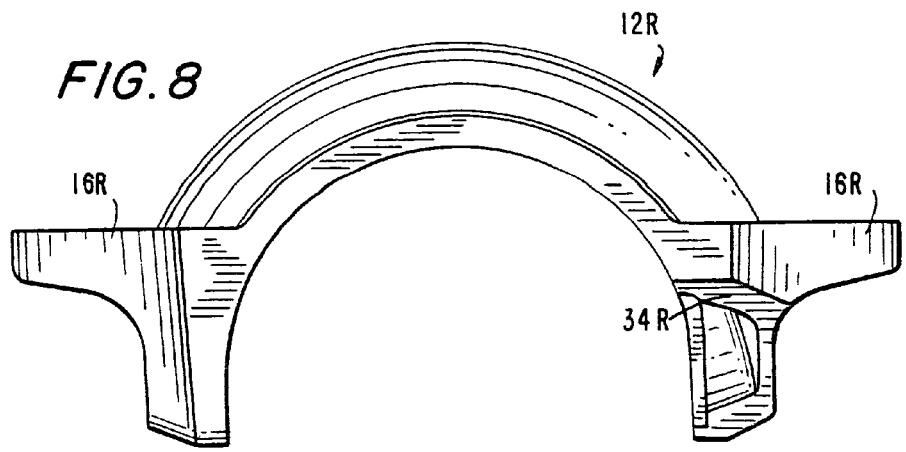
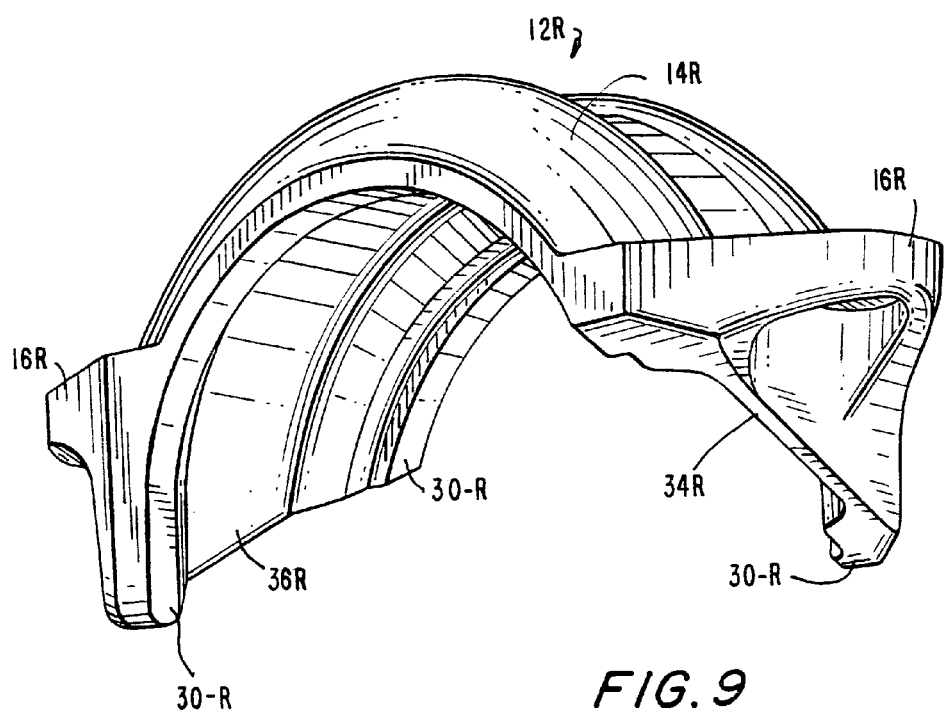

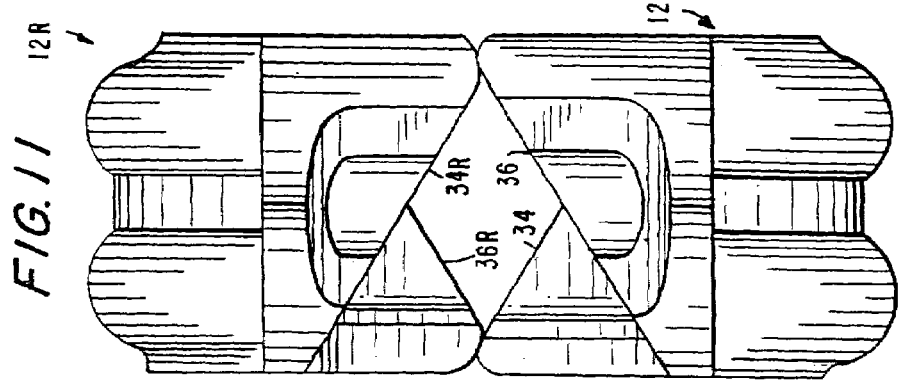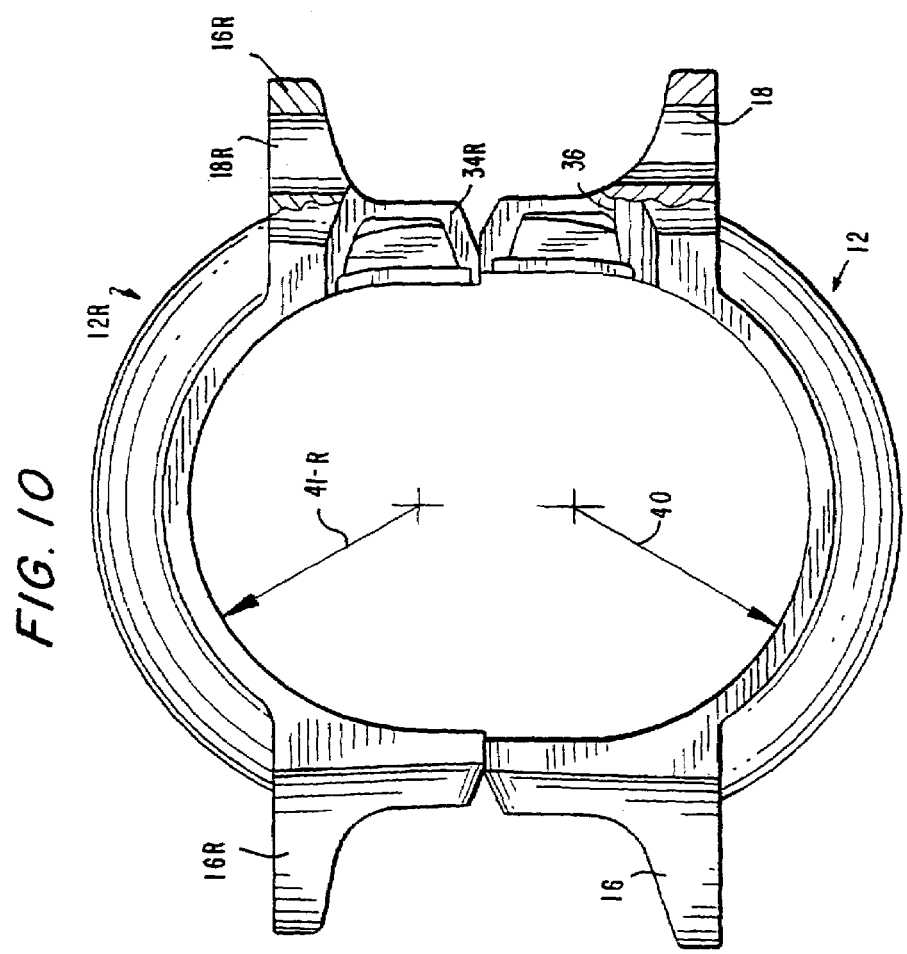

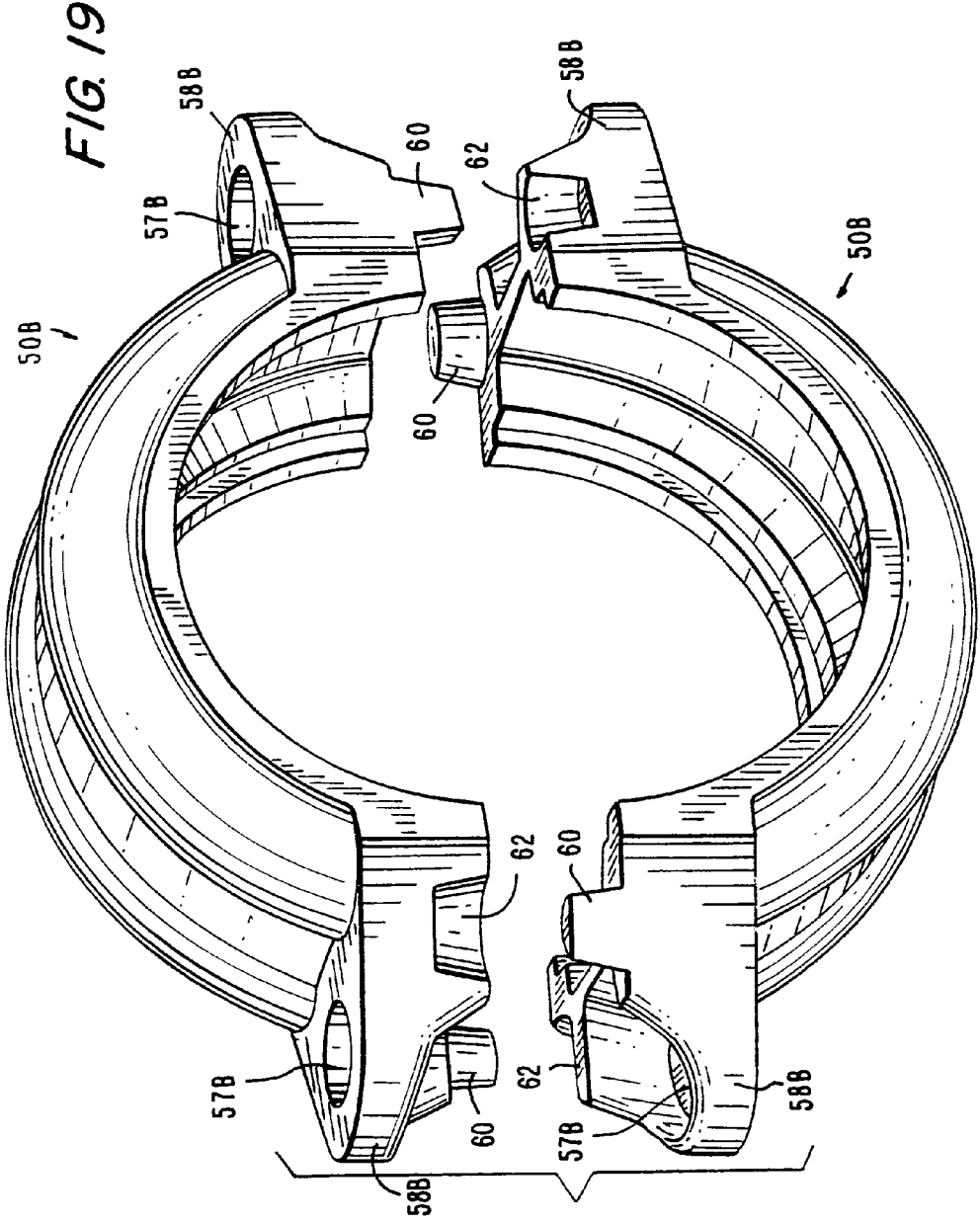

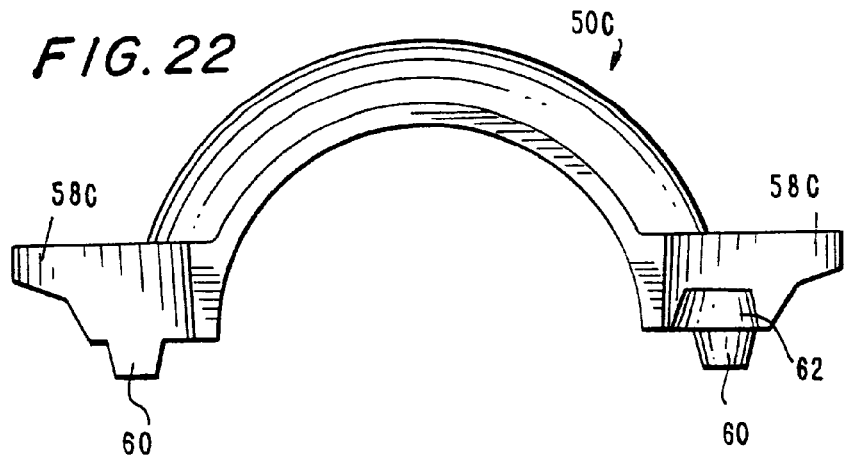
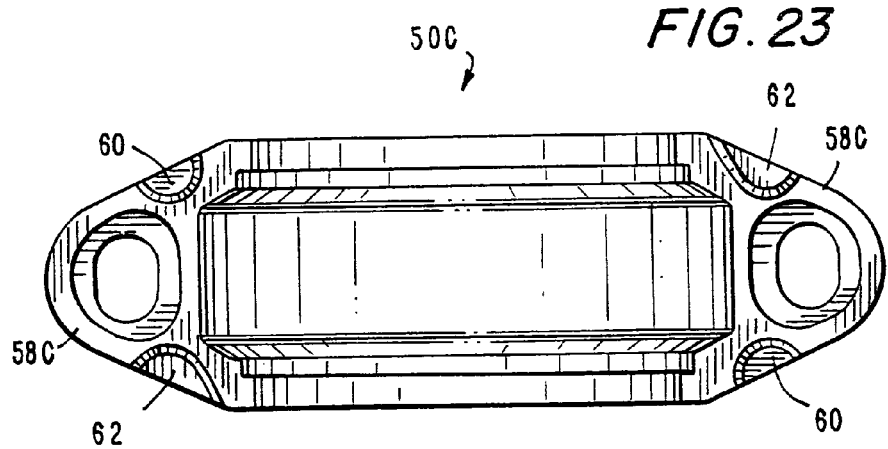

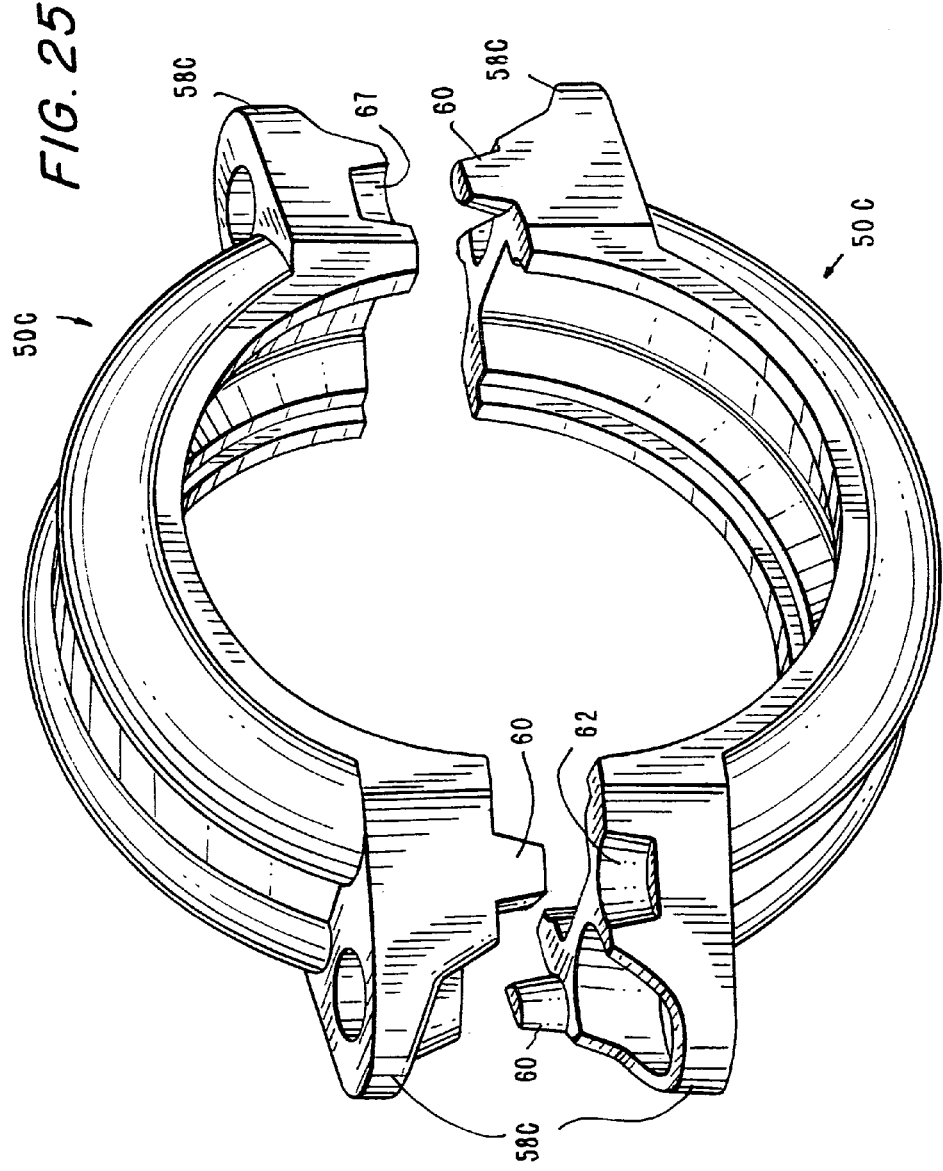

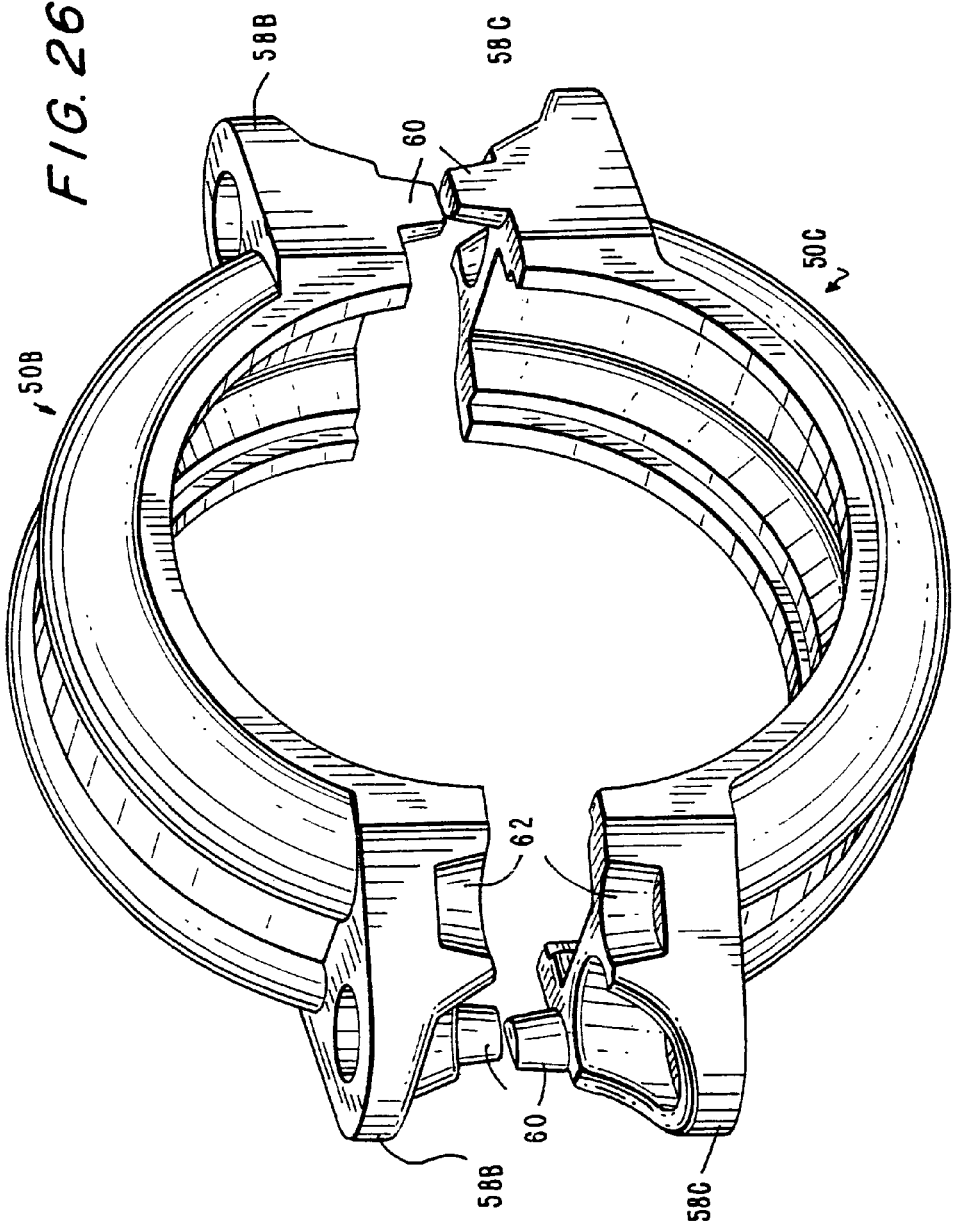

ANTI-MISMATCH OF NEAR-SIZED COUPLING SEGMENTS

RELATED APPLICATION

This applicaion is a divisional of U.S. patent application Ser. No. 09/368,680, filed Aug. 5, 1999 now U.S. Pat. No. 6,626,466.

FIELD OF THE INVENTION

This invention relates to segmented pipe couplings for use in securably connecting the ends of pipes, and in particular preventing the inadvertent mixing of near, but different, sized individual arcuate coupling segments in an assembly about the juxtaposed ends of the pipes that are to be connected.

BACKGROUND OF THE INVENTION

Segmented couplings for pipes are well known in the art, and comprise two or more coupling segments each having a recess for the reception of a sealing gasket adapted to extend over the adjacent ends of a pair of pipes, and which are to be compressed by the coupling segments into sealing relation with the external peripheries of the respective pipes.

Each such coupling segment intended to couple the ends of grooved pipe has radially inwardly extending keys at its opposite axial sides, the keys being for reception in grooves in the respective pipe ends to perform the required mechanical interconnection between the pipes.

The coupling segments are drawn towards each other by traction bolts which extend through radially outwardly extending bolting pads at the respective opposite ends of the coupling segments. In this manner, the end faces of the coupling segments are drawn towards each other for them to clamp onto each other in the case of a "flexible" coupling, or, for the coupling segments to clamp directly onto the pipe exterior in the case of a "rigid" coupling. A "flexible" coupling is well known as one which will permit relative movement of the pipes to limited extents and the angling of the axis of one of the pipes relative to the other, whereas a "rigid" coupling is one which will immobilize the pipes against any such movements. Typical of such flexible couplings are those shown in U.S. Pat. No. 3,189,969 assigned to the assignee of the present application whose teachings are incorporated by reference herein, as well as the styles 75, 77, 72, and 750 couplings available from Victaulic Company of America, Easton, Pa. Similarly, typical of such rigid couplings are those shown in U.S. Pat. No. 4,639,020 assigned to the assignee of the present invention whose teachings are incorporated by reference therein, as well as the style 07 and 005 couplings available from the Victaulic Company of America.

Segmented pipe couplings are also known for the connection to pipes which do not contain a groove at their connection locations. Such commercially available couplings include: the style 90 and 99 plain pipe end coupling; and style 920 and 929 mechanical T couplings; all available from the Victaulic Company of America.

The aforementioned segmented pipe couplings are commercially available in a successive series of seriatim increasingly sized couplings, which are naturally configured to mate with similarly increased sized pipes.

Through inadvertence it is quite possible for a workman to incorrectly receive and connect two different sized arcuate coupling segments which are relatively close in size to each other. As the incorrectly matched coupling segments are tightened about the pipe end, as by tightening their traction bolts, they will not quite match up and form a circle about their inner diameter, against the exterior, and, in the case of a grooved type coupling, within the peripheral groove of the outer circumference of the pipe ends. Further the outboard corners or surfaces of the improperly mismatched segments of different sizes will not line up evenly. This misalignment, in relatively close size coupling segments (e.g., in the order between one-sixteenth to one-quarter of an inch of each other) is oftentimes difficult to readily visually perceive. Thus the worker may in such situations mismatch the individual coupling segments connected about the pipes being connected thereby, without readily realizing that a mismatch has occurred. This results in less than optimum sealing engagement between the pipe ends. Accordingly it is desirable to prevent such an inadvertent mismatch of the individual coupling segments, while providing a segmented pipe coupling having all the other advantages of presently available segmented pipe couplings, such as typically shown in aforementioned U.S. Pat. Nos. 3,189,969 and 4,639,020 and available from Victaulic commercial styles 75, 77, 07, 005, 90, 99, 72, 750, 920, or 929. Further it is desirable to prevent such an inadvertent mismatch by a simple modification of the presently existing coupling segments, which can be accomplished in a low cost manner, and will provide the workman with a readily visual indication that a mismatch is being attempted between closely sized coupling segments.

SUMMARY OF THE INVENTION

The present invention illustratively shown in conjunction with grooved end pipe couplings provides a series of successively sized segmented pipe couplings each of which is adapted to securably connect similarly configured and sized pipe ends of juxtaposed pipes. Each of the series of segmented pipe couplings comprises two or more arcuate coupling segments, with the number of arcuate segments being determined by the size of the pipe. The segmented pipe couplings are intended to be assembled in arcuate end-to-end relationships for encircling the juxtaposed ends of the pipe to be coupled. Each of the coupling segments includes radially inwardly extending and axially spaced keys which are intended to cooperatively engage peripheral grooves about the outer circumference of the juxtaposed pipe ends being connected thereby. Bolt receiving pads are provided at the ends of each of the coupling segments for receiving bolts, with the tightening of the bolts bringing the bolt pads together to urge the individual coupling segments radially inwardly. This produces a reduction in their internal circumference and causes clamping engagement with the pipe exterior, with the keys of the coupling segments being tightly retained within their respective pipe recesses when the bolts are in their fully tightened condition. In order to prevent a mismatch of different size coupling housings which are relatively close in size, an anti-mismatch means is now provided on individual ones of the arcuate coupling segments for preventing the fully bolt tightened connection of near sized coupling segments. The anti-mismatch means will create an interference relationship which, in addition to preventing the fully bolt tightened connection of the size mismatched coupling segments to each other, gives a readily discernible visual indication to the workman that an attempt is being made to inadvertently connect two differently sized coupling segments.

When two arcuate coupling segments of the same size are brought together in an end-to-end relationship, the ends of the arcuate segments are configured to nest together in close proximity, such that the tightening of their bolts permits the coupling segments to closely encircle the outer periphery of the pipe. However, according to the present invention the ends of a near size arcuate coupling segment are modified such that if an attempt is made to couple two different, but closely sized, arcuate segments together, their ends will abut. This will prevent the desired nesting relationship necessary to properly encircle the pipe ends being connected. This non-nested, or abutting anti-mismatch, relationship between successively sized coupling segments, is provided by including a first member on one of the coupling segments and a second member on the other of the coupling segments. The first and second members of the same size coupling segments will appropriately nest together. However, the orientation of the first and second members on a near-size arcuate coupling segment differs, such that they will abut if improperly mixed with the other sized arcuate coupling segment. This provides an interference relationship, opposing the bolted connection of two successively, but differently, sized coupling segments. This interference relationship advantageously provides a separation gap between the bolt pads of the differently sized coupling segments so as to provide a visual indication that the workman is attempting to connect two differently sized arcuate coupling segments.

In accordance with one embodiment of the present invention which is a modification of the rigid grooved coupling segments shown in aforementioned U.S. Pat. No. 4,639,020, each of the ends of the arcuate coupling segment includes an inclined face. The angular direction of the inclined end faces of the same sized coupling segments correspond. Thus, in the well known manner, as two such symmetric arcuate coupling segments are bolt tightened, the nested interengagement of their inclined end faces produces self-adjustment of the coupling segments and a rigid coupling of the pipe ends. In accordance with the present invention the angular direction of the inclined end faces of the next size coupling segment is reversed. Thus while two such reversed angle coupling segments will mate with each other, if an attempt is made to couple one such reverse angled coupling segment with the smaller, non-altered, coupling segment, the inclined end faces will abut in an interference, non-nested relationship. Hence the improvement of the present invention may be incorporated in the rigid type couplings shown in aforementioned U.S. Pat. No. 4,639,020, by merely reversing the angle of the inclined end faces in alternate, successively sized coupling segments. Alternatively, the slope angle could be modified in the alternate ones of successively sized coupling segments.

Other embodiments are disclosed as a modification of the flexible groove couplings of the type shown in aforementioned U.S. Pat. No. 3,189,969. The end faces of such previously available arcuate coupling segments have been flat. When two such different size coupling segments have inadvertently been brought together, the out of round inner diameter formed thereby, which will be against the outer periphery of the pipes being joined, may not be readily discernible to the workman. To prevent this from happening, in accordance with the present invention the previously flat end faces of the next size coupling segments now include cooperating projections and recesses. When two such coupling segments of the same size are brought together their projections and recesses will mate in nesting relationship. However, should an attempt be made to connect one such coupling segment to a coupling segment having a flat end surface, the abutment of the projection against the flat end surface of the other coupling segment will provide an interference. This serves as an anti-mismatch means to readily advise the workman that an attempt is being made to connect two differently sized flexible groove coupling members.

As a further modification of the present invention intended for use in conjunction with flexible groove couplings, none of the coupling segments will have a flat end face. Each of the coupling segments will include a projection and cooperating recess. However, the orientation of the projection and cooperating recess on the next size coupling segment will be reversed. Thus should two of the same size coupling segments be brought together, their respective projections and recesses will mate in a nested relationship. However should an attempt be made to connect one such coupling segment with the next size coupling segment, their projection will abut, thereby preventing the nested interengagement therebetween. Such abutment will again provide a readily visually discernible indication to inform the workman that an attempt is being made to connect two differently sized coupling segments. Alternatively, instead of reversing the location of the projections and recesses in alternate sized couplings, their shape could be changed.

It is therefore seen that a primary object of the present invention is to provide an anti-mismatch means to prevent the connection of two different, but closely, sized arcuate coupling segments about juxtaposed pipe ends.

A further object of the present invention is to provide such arcuate coupling segments in which the anti-mismatch means is provided by a simple modification of presently available commercial arcuate coupling segments.

Yet another object of the present invention is to provide such arcuate coupling segments in which the anti-mismatch means is provided by reversing the orientation of the surfaces at the end-to-end connection of otherwise symmetrically configured arcuate coupling segments.

Yet another object of the present invention is to provide an anti-mismatch means in conjunction with rigid grooved coupling segments having inclined end faces, in which the angle of inclination is reversed or its slope changed in the alternate ones of a series of successively sized coupling segments.

An additional object of the present invention is to provide such arcuate coupling segments which are of the flexible groove type, in which the end faces of mismatched coupling segments will produce an interference gap.

Yet another object of the present invention is to provide a series of successively sized segmented pipe segments wherein an anti-mismatch means is provided at their end faces to produce a separation gap should an attempt be made to connect two different, but closely, sized arcuate coupling segments.

These as well as other objects of the present invention will become apparent upon a description of the following drawings in which:

BRIEF DESCRIPTION OF THE DRAWINGS

FIG. 6 is a front view showing the prior art mismatched connection of two differently sized arcuate pipe segments of the type shown in FIGS. 1–5, with the bolts shown in place, but the pipe and gasket still removed for purposes of clarity.

FIG. 7 is a side view of FIG. 6.

FIG. 8 is a front view of the modified near sized arcuate coupling segment shown in FIGS. 3 and 4 in accordance with the present invention.

FIG. 9 is a perspective view of the coupling segment shown in FIG. 8.

FIG. 10 is a front view of the attempted bringing together of the coupling segment shown in FIGS. 3 and 4 with the near size modified coupling segment of FIGS. 8 and 9.

FIG. 11 is a side view of FIG. 10.

FIG. 19 is an exploded perspective view corresponding to the condition of FIG. 18, showing the two symmetric and same sized coupling segments in accordance with the present invention being joined together with their respective projections about to enter the cooperating recesses.

FIGS. 22 and 23 generally correspond to FIGS. 16 and 17 but show the modification of the next sized coupling segment with the reverse orientation of its cooperating projections and recesses.

FIG. 25 is an exploded perspective view similar to FIG. 19, but showing two of the coupling segments of FIGS. 22 and 23.

FIG. 26 is an exploded perspective view corresponding generally to FIG. 25 but showing the resulting mismatch of attempting to connect a coupling segment shown in FIGS. 16 and 17 with the reverse oriented coupling segment of FIGS. 22 and 23.

DETAILED DESCRIPTION OF THE PREFERRED EMBODIMENTS

Figure 1:
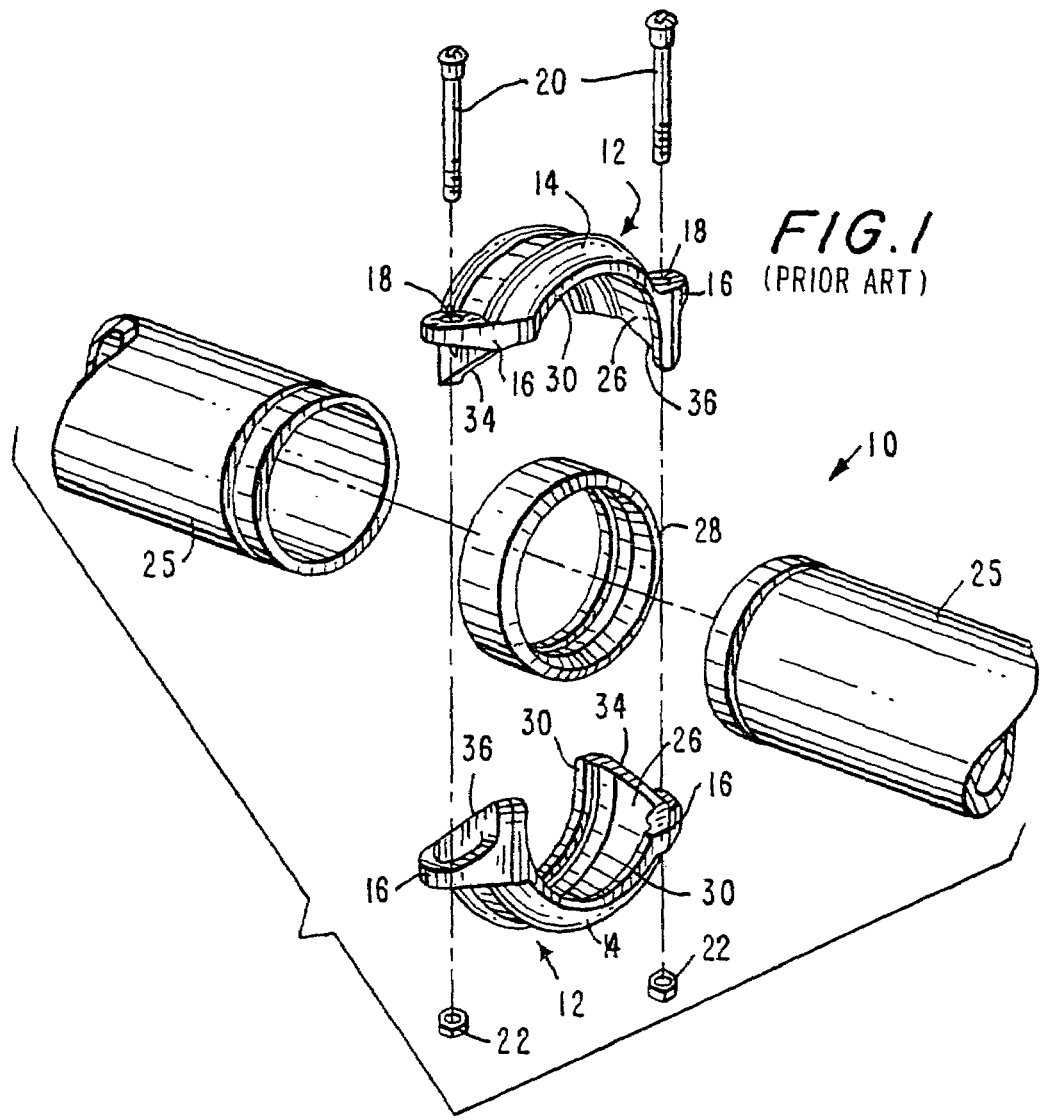
FIG. 1 is an exploded perspective view showing the manner in which one form of the rigid coupling segments, which are to be modified in accordance with the present invention, are intended to be connected to juxtaposed pipe ends.
Figure 2:
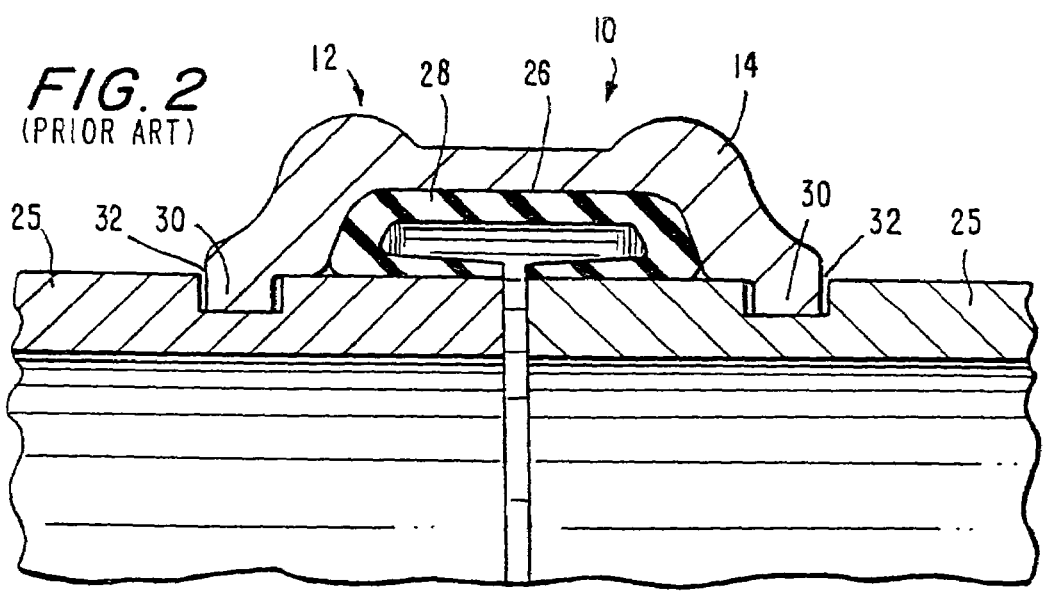
FIG. 2 is a longitudinal cross-section view taken in a vertical plane through one of the coupling segments of FIG. 1 in its assembled relationship without the juxtaposed pipe ends.
Figure 3:
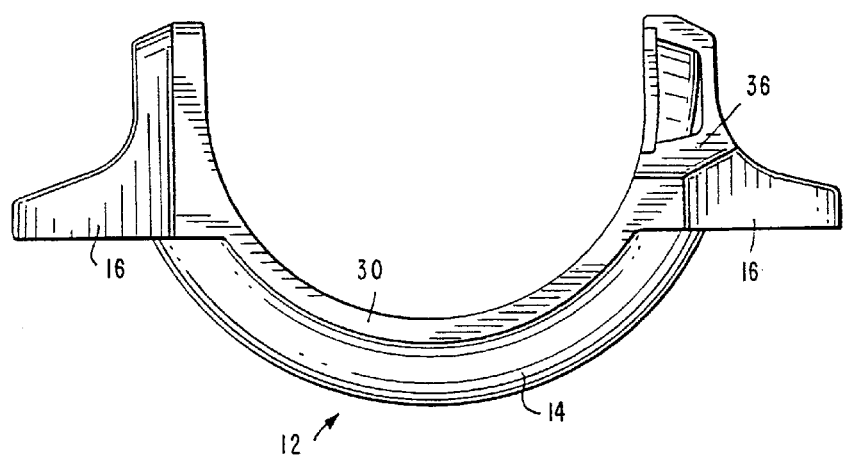
FIG. 3 is a front view of the arcuate coupling segment shown in FIGS. 1 and 2.
Figure 4:
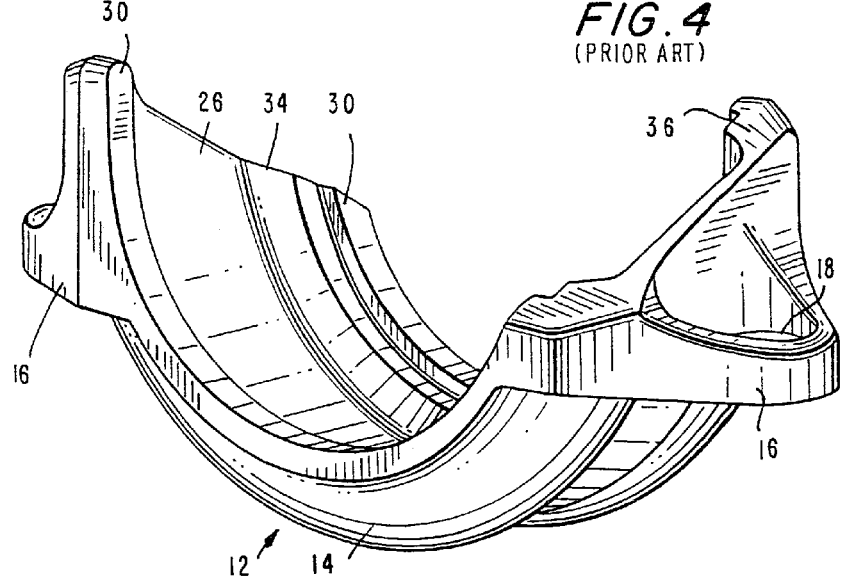
FIG. 4 is a perspective view thereof.

Reference is initially made to FIGS. 1–5 which show one form of a segmented pipe coupling which is to be modified in accordance with the present invention to provide an anti-mismatch of differently sized arcuate coupling segments. This coupling is of the rigid type as described in aforementioned U.S. Pat. No. 4,639,020. The segmented pipe coupling 10 includes arcuate coupling segments 12. The coupling segments 12 are identical with each other, and are substantially semicircular in form. Each coupling member 12 comprises an arcuate body 14 which terminates at its ends in radially outwardly extending bolting pads 16 formed integrally with the body portion 14. While the segmented pipe coupling 10 illustrated in these drawings is comprised of only two coupling segments 12, it will be appreciated that the present invention is equally adaptable to segmented couplings comprising three or more coupling segments which are used in conjunction with larger pipe diameters. The use of multiple coupling segments facilitates the manual handling of the segments and the assembly of the coupling segments onto the pipes. Additionally, the formation of such large size arcuate coupling segments from multiple coupling segments facilitates the manufacture of such large segmented couplings compared to such large sized couplings which may be comprised of only two arcuate coupling segments.

Each of the radially extending bolting pads 16 includes an aperture 18 for the reception of fasting members such as headed bolts 20. In their assembled condition, the respective arcuate coupling segments 12 are secured to each other in encircling relationship about the juxtaposed ends of pipes 25 by the headed bolts 20 and conventional nuts or lock nuts 22 threadedly received on the bolts 20. Internally of each coupling segment half 12 and intermediate the axial length thereof is a recess 26 in which a lubricated gasket 28 is employed to seal the pipes 25 and prevent leakage when the coupling is in its assembled condition.

Located immediately adjacent the gasket recess 26 of each coupling segment is an axial key 30 formed integrally with the coupling segment. Although one key is shown at each axial end of the coupling segments 12, the invention may also be used in similar pipe couplings intended for higher pressure applications which may include a plurality of keys at each axial end of the coupling segment. The respective keys are appropriately dimensioned to be received within correspondingly dimensioned annular grooves 32 (see FIG. 2) formed in the respective ends of the juxtaposed pipes 25 to be connected by the segmented pipe coupling 10.

To install the segmented pipe coupling 10, the ends of the juxtaposed pipes 25 are brought into proximity with each other, with the gasket 28 providing sealing relationship with the pipe ends upon complete bolted installation of the coupling 10. The respective coupling segments 12 are positioned over the gasket 28 with the gasket contained within the recess 26, and the keys 30 inserted into the annular grooves 32 in the respective pipe ends. The bolts 20 are then inserted through the aligned apertures 18 of the coupling segments, and the coupling segments are drawn towards each other by tightening the nuts 22 down on the bolts 20. This draws the respective coupling segments 12 towards the pipes 25 and compresses the gasket 28 into intimate sealing contact with respective pipe ends.

Figure 5:
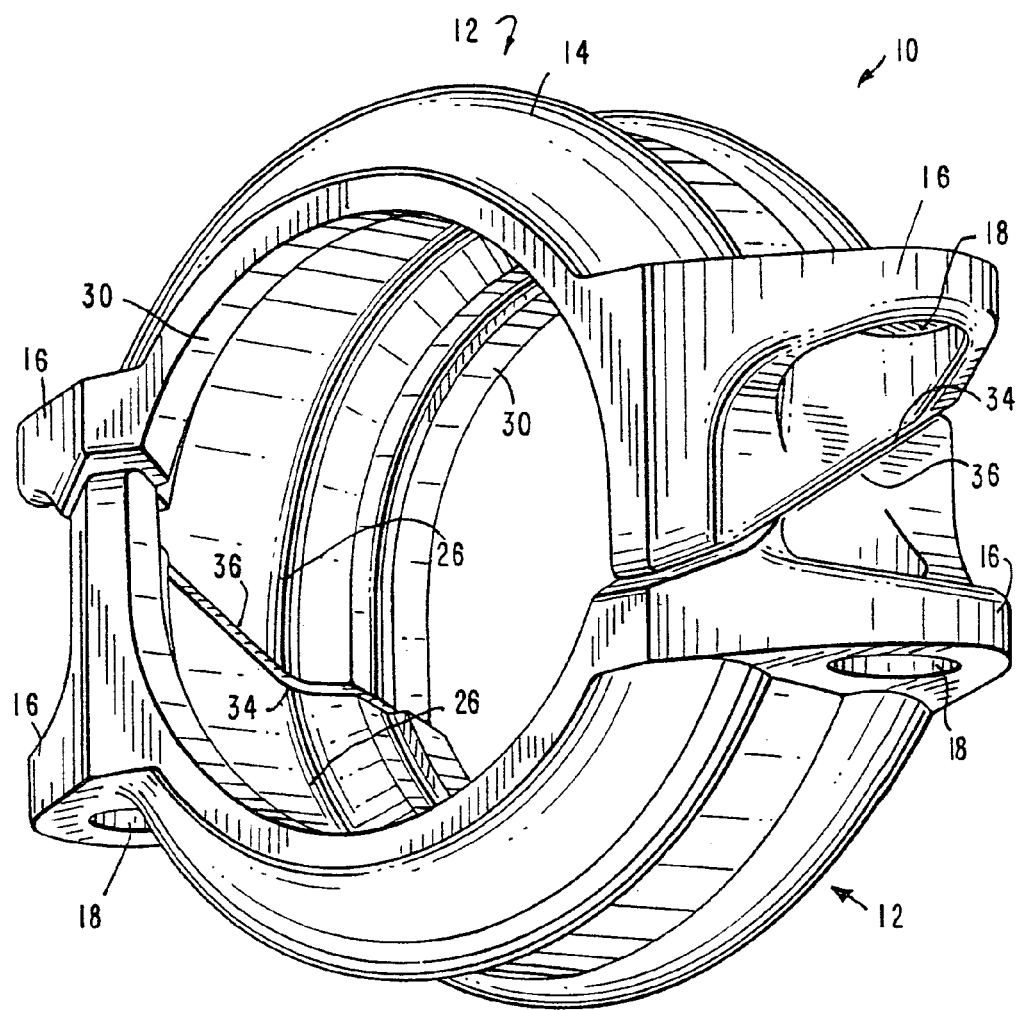
FIG. 5 is a perspective view showing the joining of two arcuate coupling segments of the type shown in FIGS. 1–4, with the pipe ends, bolts, and gasket being deleted for purposes of clarity.

The ends of the arcuate coupling segments 12 include inclined end faces 34, 36 at their opposed ends. The angular orientation of inclined faces 34, 36 of the two arcuate coupling segments 12, which are of the same size, will mate in a nested relationship, as best shown in FIG. 5. The opposite angling of the faces 34, 36 which are in engagement will act to urge the end of one of the coupling segments inwardly to decrease the radius of that coupling segment, while simultaneously urging the ends of the other coupling segment outwardly to increase the radius of that coupling segment. In this manner the respective coupling segments flex and permit the respective coupling segments to move into rigid clamping engagement to compensate for an oversizing, or undersizing, as the bolt members 20 are tightened by their nuts 22 with reference being made to aforementioned U.S. Pat. No. 4,639,020 for further explanation of this movement and resulting advantages.

The coupling segments 12 are commercially available in a series of increased sizes for use for connecting correspondingly increased sized pipes 25. The adjacent ones of such a seriatim series of successively sized segmented pipe couplings 12 may be relatively close to each other, typically differing within one-sixteenth to one-quarter of an inch.

FIGS. 6 and 7 show the prior art situation where a workman may have inadvertently connected a coupling segment 12, as shown in prior FIGS. 1–5, with the next, but closely, sized similarly configured coupling segment 12A. Those parts of coupling 12A which correspond to coupling segment 12 are similarly numbered with the -A suffix. Coupling segments 12 and 12A are relatively close in size. Hence it will be possible for the workman to place the bolts 20 through their bolt pads 16, 16A and tighten nuts 22 to the conditions shown in FIGS. 6 and 7. Since the radius 41 of arcuate coupling segment 12A is longer than radius 40 of arcuate coupling segment 12, the segments 12, 12A will not match up, and their internal area will not properly encircle the pipe ends. This mismatch, in closely sized coupling segments, may be difficult for the workman to perceive, resulting in a mismatch of the arcuate coupling segments being employed around the pipe. This, as can well be understood, negatively affects the ability of the assembled segmented coupling of differently sized arcuate segments to provide a secure and rigid seal about the juxtaposed pipe ends.

Figure 12:
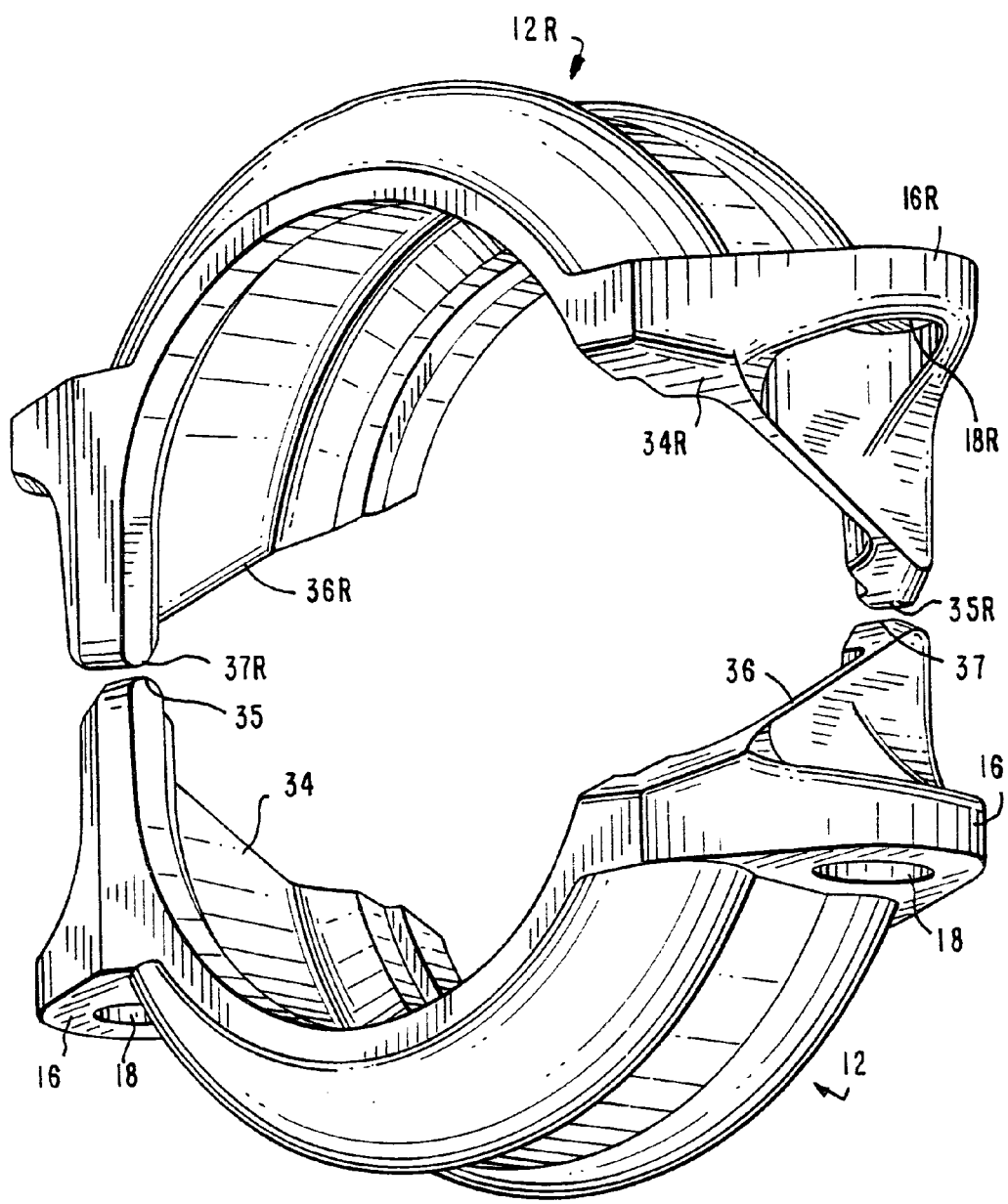
FIG. 12 is a perspective view of the situation corresponding to FIGS. 10 and 11, in which an attempt has been made to incorrectly bring together the two near size coupling segments which are configured in accordance with the present invention.

To prevent the occurrence of the situation shown in FIGS. 6 and 7, the present invention reverses the angles of the end faces of the next size coupling segments as best shown in FIGS. 8 and 9, with those reverse angular faces being designated as 34R and 36R. The other corresponding components of the reverse arcuate segment 12-R are designated with corresponding numerals but with the -R suffix. As a result of the reversing the angular direction of incline faces 34R and 36R with respect to their corresponding faces 34 and 36 of the next smaller (or larger) sized arcuate coupling segments, should an attempt be made to connect coupling segment 12R with coupling segment 12 the abutting, interference situation shown in FIGS. 10–12 occurs. That is, instead of there being the nested relationship between the inclined surfaces 34-36, as shown in FIG. 5, there will be an abutting, non-nested relationship between inclined surfaces 36, 34R, and 34, 36R. Further, their ends 35R-37 and 37R-35 will be in pointed engagement thereby providing a readily discernible gap between the arcuate segments 12-12R. This prevents the insertion of bolts 20 within their respective bolt pads to tighten the mismatched sized segments 12-12R together. Thus the reversal of the angular faces 34R, 36R with respect to 34 and 36 in the next size arcuate coupling segment serves as an effective mismatch means to prevent the workman from inadvertently connecting two closely sized arcuate segments, as had previously been readily possible, as shown in the prior art of above FIGS. 6 and 7. Alternatively, instead of reversing the angular faces 34, 36 to 34R, 36R in the next sized coupling, the slope angle of faces 34, 36 could be appropriately modified to provide the readily discernible mismatch.

Figure 13:
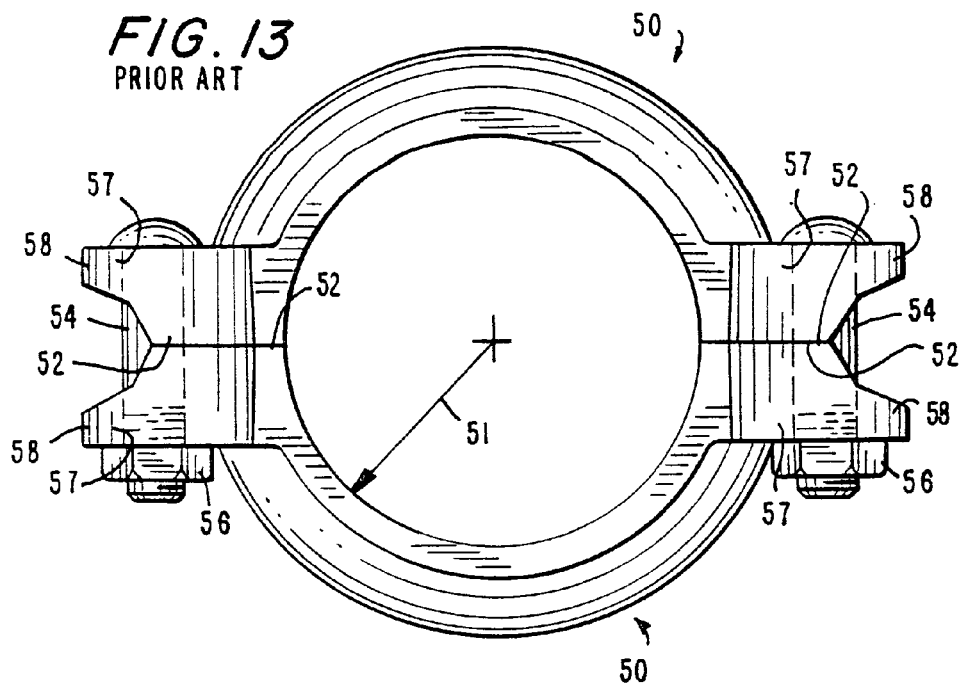
FIG. 13 is a front view showing the prior art connection of two same size arcuate coupling segments of the flexible type, with the pipe and gasket being deleted for purposes of clarity.
Figure 14:
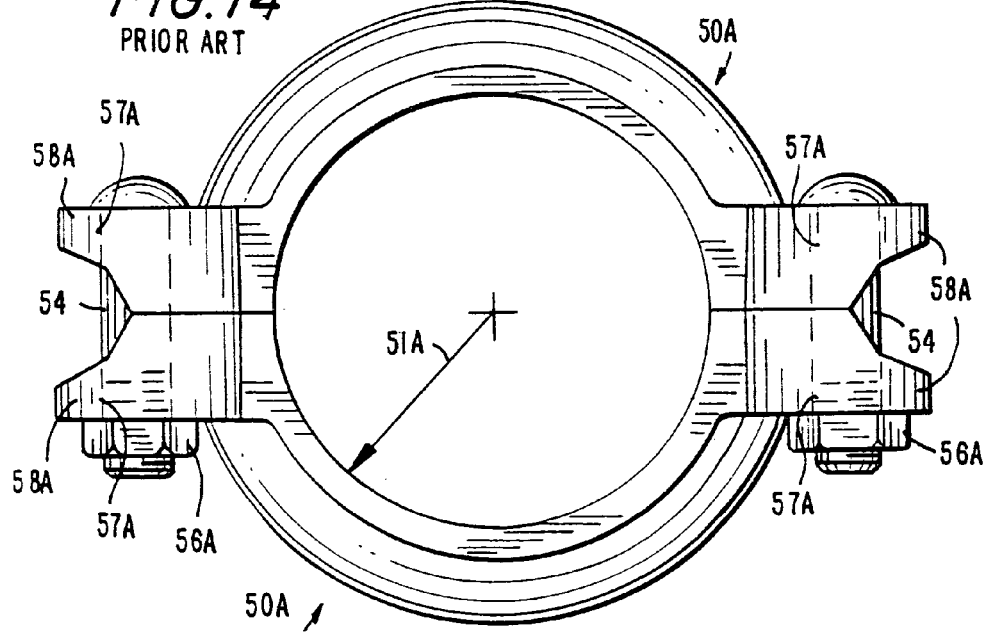
FIG. 14 corresponds to FIG. 13 but shows the prior art connection of the next larger size coupling segments.

Reference will now be made to FIGS. 13–26 which show several embodiments for incorporating the anti-mismatch means of the present invention in conjunction with a flexible type segmented type coupling of the type shown in aforementioned U.S. Pat. No. 3,189,969. Such segmented pipe couplings are designed to permit controlled angular, linear, and rotational movement at the joint to accommodate expansion, contraction, settling, vibration, and other limited piping system movement. As contrasted to the angular juncture faces such as 34, 36 shown in the above described rigid coupling embodiment, the juncture faces 52 of the prior art arcuate coupling segments 50 have been flat. As in the prior embodiment, the individual coupling segments 50 are joined together by bolts 54 and nuts 56 which extend through aligned apertures 57 in their bolt pads 58. FIG. 13 depicts the prior art situation where two identical sized coupling segments 50 having radius 51 are joined. Similarly, FIG. 14 depicts the prior art situation where two identical, but near sized coupling segments 50-A of radius 51A are joined. Those components in arcuate segment 50-A, which correspond to portions of the smaller size arcuate segment 50, are designated by the same numeral, with the -A suffix. In both FIGS. 13 and 14 where the arcuate segments of the same size are being connected they will naturally match up and their inner diameter will appropriately encircle the pipes being joined.

Figure 15:
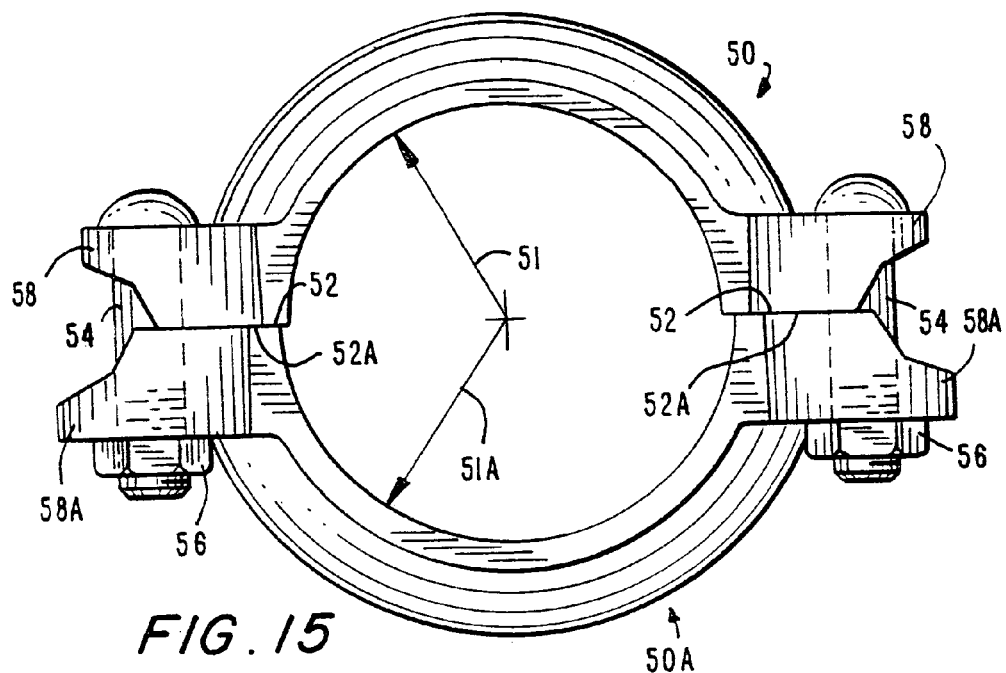
FIG. 15 shows the prior art connection of one of the coupling segments shown in FIG. 13 to the next larger size coupling segment shown in FIG. 14.

Reference is now made to FIG. 15 which shows the prior art result should the workman inadvertently connect arcuate coupling segment 50 with the next larger size coupling segment 50-A. Upon close examination it is observed that a mismatch has occurred since the radius 51 of arcuate coupling segment 50 is less than the radius 51A of arcuate coupling segment 50-A, resulting in an out of round internal diameter established between coupling segments 50 and 50-A. However, since the sizes between successive coupling segments 50, 50-A can be relatively close to each other the mismatch of FIG. 15 may not be readily apparent to the workman, resulting in the inadvertent incorrect assembly of such coupling segments. This will naturally result in an inferior pipe connection.

Figure 18:
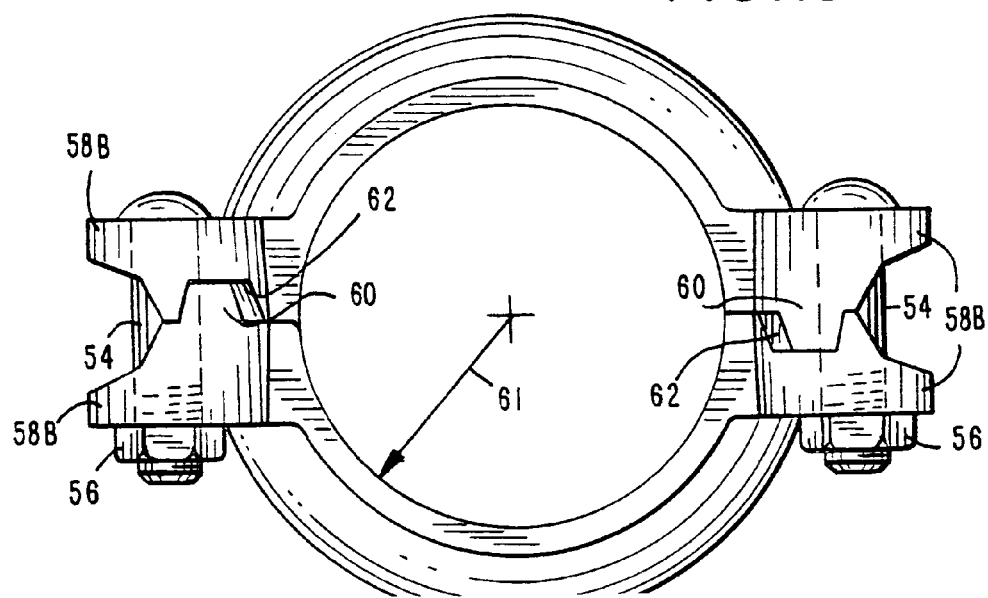
FIG. 18 is a front view showing the manner in which two symmetric, and identically sized, coupling segments shown in FIGS. 16 and 17 are joined together.
Figure 16:
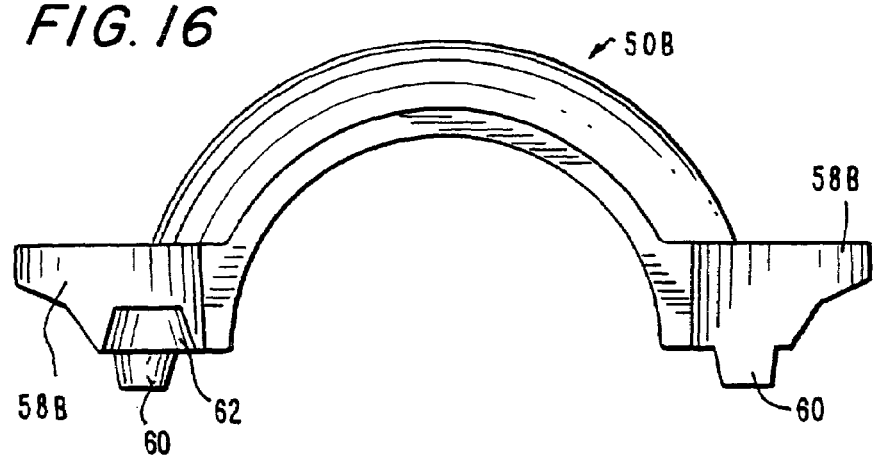
FIG. 16 is a front view of a modification of one of the coupling segments shown in aforementioned FIGS. 13–15 in accordance with the present invention, in which the bolt pads at their end faces include cooperating projections and recesses.
Figure 17:
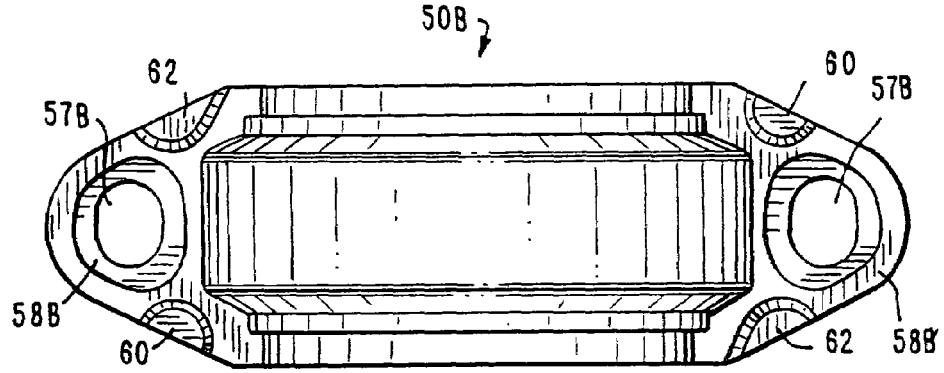
FIG. 17 is a bottom view of the coupling segment shown in FIG. 16.
Figure 20:
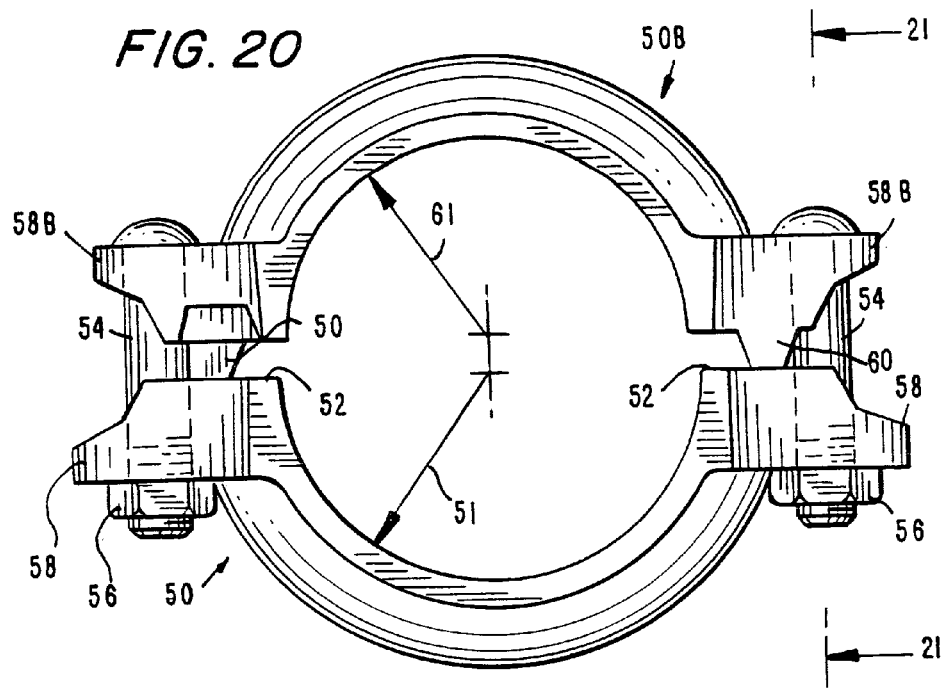
FIG. 20 is a front view which shows the result of attempting to improperly join a coupling segment shown in FIG. 13 with the next size coupling segments of FIGS. 16 and 17.
Figure 21:
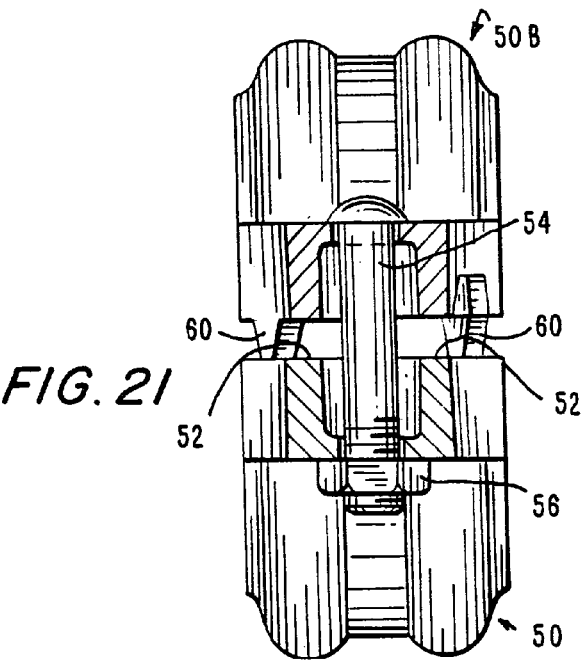
FIG. 21 is an end view of FIG. 20.

In order to prevent the situation of FIG. 15 from occurring, one of the coupling segments, such as 50-A, may be modified, to coupling segment 50-B shown in FIGS. 16 and 17. The construction of FIGS. 16 and 17 may be used to form the next larger size arcuate coupling segment, previously shown as 50-A, with radius 61 (as shown in FIGS. 18 and 20) corresponding to 51A. Instead of the flat surface 52-A, a projection 60 and recess 62 are provided radially inward of each bolting pad 58-B. When two identically sized arcuate coupling segments 50-B are utilized, the projection 60 and 62 will mate in a nesting arrangement, as shown in FIGS. 18 and 19. However if the next size arcuate coupling segment (corresponding in size to previous coupling segment 50-A) is configured in accordance with coupling segment 50-B, and an attempt is made to connect that coupling segment 50B to smaller size coupling segment 52, the situation shown in FIGS. 20 and 21 will occur. Namely the projections 60 of coupling segment 50-B will abut the flat surfaces 52 of coupling segment 50. This will provide a separation gap therebetween, and prevent a fully bolt tightening, of coupling segments 50 and 50-B.

Figure 24:
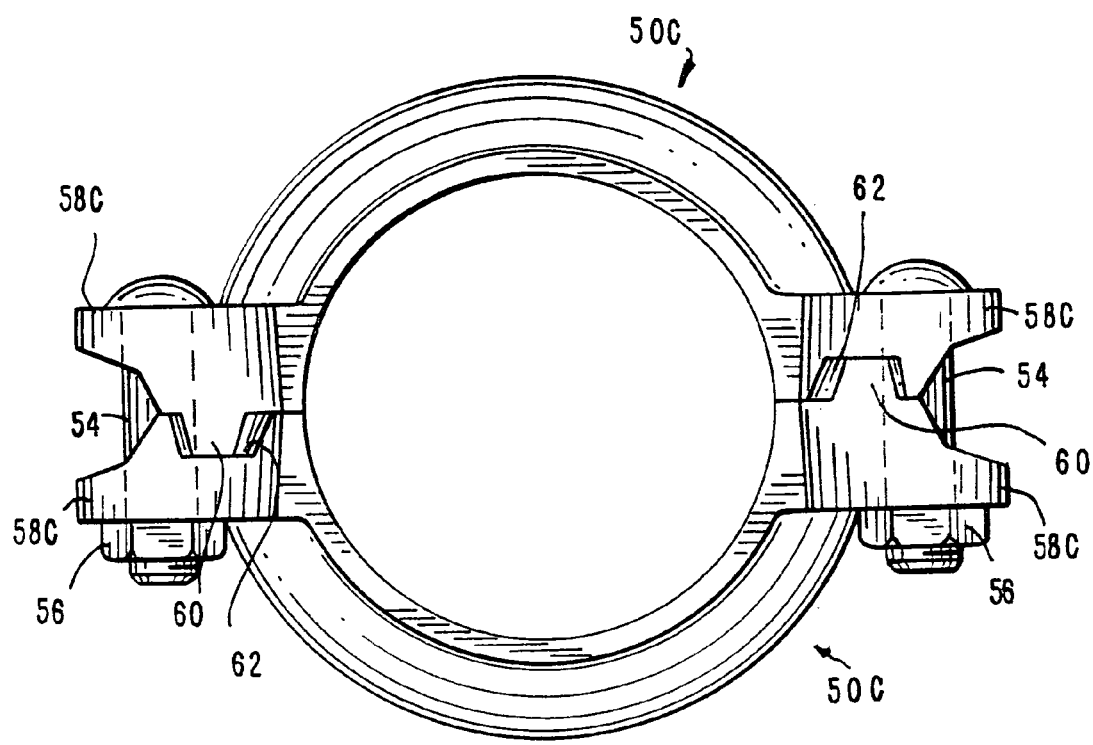
FIG. 24 is a front view, similar to FIG. 18, but showing the connection of two arcuate coupling segments shown in FIGS. 22 and 23.

Reference is now made to FIGS. 22 and 23 in which the arcuate coupling segment 50, having a flat mating surface 52, is now replaced with arcuate segment 50C in which the mating surfaces include projections 60 and 62 conceptually similar to segment 50B, but reversed in location. That is, where the projection 60 was provided in arcuate arc segment 50-B, a recess is now provided in arcuate arc segment 50C. Similarly where a recess was provided in arcuate arc segment 50-B, a projection is provided in arcuate arc segment 50C. When two such arcuate arc segments 50C of the same size are brought together a matched, nested condition will result as shown in FIGS. 24 and 25. However, should an attempt be made to connect arcuate segment 50-B with differently sized arcuate segment 50-C, their projections 60 will abut, as shown in FIG. 26. This will prevent their being bolted together in a tightened condition and provide readily discernible visual indication to the workman that a size mismatch is being attempted. Hence the reverse location of projection 60 and cooperating recess 62 in successively sized coupling segments 50-B and 50C provides an anti-mismatch means.

As an alternative arrangement (not shown), instead of reversing the location of the projections and recesses in the alternate arcuate segments, their shape may be altered to provide a mismatch of such alternate sized coupling segments.

It should be readily appreciated that in the embodiment shown in FIGS. 1–12, the alternate size arcuate coupling segments of a seriatim series will have their inclined faces oriented in the same direction and the successively sized coupling segments therebetween will have their inclined faces in the opposed direction. That is, when there are four such successively sized segmented pipe couplings, the inclination will be the same in the first and third coupling segments, while the inclination will be the reverse thereof, and the same in the second and fourth coupling segments. In that arrangement the first and third coupling segments, as well as the second and fourth coupling segments, will be of sufficiently different size such that the workman will be aware that a mismatch is occurring without necessitating reverse angular faces. Similarly, in the embodiments shown in FIGS. 16–26 where there are four successively sized segmented pipe couplings the first and third coupling segment will have these projections 60 and recesses 62 in the same location, whereas the second and fourth arcuate coupling segments will have a reverse orientation.

In summation, the present invention advantageously modifies the configuration of various types of arcuate coupling segments so as to avoid an inadvertent mismatch between similarly sized but otherwise identically configured arcuate coupling segments. In particular the present invention may be employed in conjunction with a rigid type segmented pipe coupling as typically shown in aforementioned U.S. Pat. No. 4,639,020, or a flexible type segmented pipe coupling as typically shown in aforementioned U.S. Pat. No. 3,189,969.

While the present invention has been described in conjunction with preferred embodiments thereof, other modifications will suggest themselves to those familiar with pipe couplings wherein it is desirable to employ means to avoid close size mismatch, such as in conjunction with the aforementioned Victaulic styles 90, 99, 72, 750, 920, and 929 segmented pipe couplings, all of which are considered to be within the spirit and scope of the invention as defined by the following claims.

I claim:

1. In a series of successively sized segmented pipe couplings each coupling adapted to securably connect the similarly configured and sized pipe ends of juxtaposed pipes;

each one of said series of segmented pipe couplings comprising at least two arcuate segments to be assembled in arcuate end-to-end relationship for encircling the juxtaposed ends of the pipes to be coupled;

each of said coupling segments including;

radially inwardly extending and axially spaced first and second keys, said first keys of the juxtaposed coupling segments being in circumferential alignment, and said second keys of the juxtaposed coupling segments being in circumferential alignment, each of said first and second keys being adapted to cooperatively engage a peripheral groove about the outer circumferences of one of the juxtaposed pipe ends, and bolt receiving pads at the ends of each of said coupling segments for receiving bolts to securably maintain the individual coupling segments of each series about the juxtaposed pipe ends, with the tightening of said bolts bringing the bolt pads together to urge the individual coupling segments radially inward to produce a reduction in the internal circumference of the coupling and cause clamping engagement with the pipe exterior, with said keys being tightly retaining within their respective pipe recesses when said bolts are in their fully tightened condition;

each one of said series having a different diameter and intended to couple together two pipes having the same pipe diameter;

each first segmented pipe coupling in a first one of said series having a first diameter and each second segmented pipe coupling in a second one of said series having a second diameter, said second segmented pipe couplings being the next successively sized couplings within said series after said first segmented pipe couplings, with said second diameter being greater than said first diameter, said first segmented pipe couplings being intended to couple together pipes having respective pipe diameters that are different from the respective pipe diameters of pipes that said second segmented pipe couplings are intended to couple together, wherein said coupling segments m any one of said series are identical to each other and symmetric such that each bolt pad on any coupling segment in any one of said series is alignable into a fully bolt tightened connection with any bolt pad of any other coupling segment in that one of said series, the improvement comprising:

anti-mismatch means provided on the individual ones of said coupling segments for preventing the fully bolt tightened connection of a coupling segment of said first one of said series to a coupling segment of said second one of said series, said second diameter being only slightly greater than said first diameter, wherein each anti-mismatch means provided on the coupling segments of said first one of said series has a first structural symmetry and each anti-mismatch means provided on the coupling segments of said second one of said series has a second structural symmetry different from said first structural symmetry, such that any two of the coupling segments of said first one of said series will nest together with matching symmetries, any two of the coupling segments of said second one of said series will nest together with matching symmetries, but any coupling segment of said first one of said series is prevented from nesting with any coupling segment of said second one of said series by their different symmetries, wherein said anti-mismatch means includes a first member on a first of said coupling segments in each of said series, and a second member on a second of said coupling segments of each of said series, the first and second members of said first one of said series of segmented pipe couplings configured and located to nest as their coupling segments are bolt tightened, such that the ends of said coupling segments are brought together in close proximity to encircle a pipe of a diameter corresponding to said first diameter, the first and second members of said second ones of said series of pipe couplings configured and located to nest as their coupling segments are bolt tightened, such that the ends of said coupling segments are brought together in close proximity to encircle a pipe of a diameter corresponding to said second diameter, the orientation of said first and second members of said first one of said series of segmented pipe couplings differing from the orientation of said first and second members of said second one of said series such that said first and second members of their respective segmented pipe couplings provide an interference relationship opposing the bolted connection of an arcuate coupling segment of said first one of said series to an arcuate coupling segment of said second one of said series, and wherein said first member being a projection and said second member being a recess configured to receive said projection, the location of said projection and recess in said second one of said series being the reverse of said first one of said series, such that if two coupling segments of the same one of said first or second series are in juxtaposition a projection of each coupling segment will enter a recess of the other coupling segment to permit close engagement therebetween, and if a coupling segment of said first series is in juxtaposition to a coupling segment of said second series their projections will abut to prevent close engagement therebetween.

2. In a series of successively sized segmented pipe couplings according to claim 1, wherein said interference relationship provides a separation gap between the bolt pads of juxtaposed coupling segments of said first and second ones of said series, preventing the bringing together of the bolt pads of juxtaposed coupling segments of said first and second series to their fully tightened condition.

3. In a series of successively sized segmented pipe couplings, each coupling adapted to securably connect the similarly configured and sized pipe ends of juxtaposed pipes;

each one of said series of segmented pipe couplings comprising at least two arcuate segments to be assembled in arcuate end-to-end relationship for encircling the juxtaposed ends of the pipes to be coupled;

each of said coupling segments including:
  radially inwardly extending and axially spaced first and second keys, said first keys of the juxtaposed coupling segments being in circumferential alignment, and said second keys of the juxtaposed coupling segments being in circumferential alignment, each of said first and second keys being adapted to cooperatively engage a peripheral groove about the outer circumference of one of the juxtaposed pipe ends, and
  bolt receiving pads at the ends of each of said coupling segments for receiving bolts to securably maintain the individual coupling segments of each series about the juxtaposed pipe ends, with the tightening of said bolts bringing the bolt pads together to urge the individual coupling segments radially inward to produce a reduction in the internal circumference of the coupling and cause clamping engagement with the pipe exterior, with said keys being tightly retained within their respective pipe recesses when said bolts are in their fully tightened condition;

each one of said series having a different diameter and intended to couple together two pipes having the same pipe diameter;

each first segmented pipe coupling in a first one of said series having a first diameter and each second segmented pipe coupling in a second one of said series having a second diameter, said second segmented pipe couplings being the next successively sized couplings within said series after said first segmented pipe couplings, with said second diameter being greater than said first diameter;

said first segmented pipe couplings being intended to couple together pipes having respective pipe diameters that are different from the respective pipe diameters of pipes that said second segmented pipe couplings are intended to couple together, wherein said coupling segments in any one of said series are identical to each other and symmetric such that each bolt pad on any coupling segment in any one of said series is alignable into a fully bolt tightened connection with any bolt pad of any other coupling segment in that one of said series, the improvement comprising:
  anti-mismatch means provided on the individual ones of said coupling segments for preventing the fully bolt tightened connection of a coupling segment of said first one of said series to a coupling segment of said second one of said series, said second diameter being only slightly greater than said first diameter,
  wherein each anti-mismatch means provided on the coupling segments of said first one of said series has a first structural symmetry and each anti-mismatch means provided on the coupling segments of said second one of said series has a second structural symmetry different from said first structural symmetry, such that any two of the coupling segments of said first one of said series will nest together with matching symmetries, any two of the coupling segments of said second one of said series will nest together with matching symmetries, but any coupling segment of said first one of said series is prevented from nesting with any coupling segment of said second one of said series by their different symmetries, wherein said anti-mismatch means includes a first member on a first of said coupling segments in each of said series, and a second member on a second of said coupling segments of each of said series, the first and second members of said first one of said series of segmented pipe couplings configured and located to nest as their coupling segments are bolt tightened, such that the ends of said coupling segments are brought together in close proximity to encircle a pipe of a diameter corresponding to said first diameter, the first and second of said second ones of said series of segmented pipe couplings configured and located to nest as their coupling segments are bolt tightened, such that the ends of said coupling segments are brought together in close proximity to encircle a pipe of a diameter corresponding to said second diameter, the orientation of said first and second members of said first one of said series of segmented pipe couplings differing from the orientation of said first and second members of said second one of said series, such that said first and second members of their respective segmented pipe couplings provide an interference relationship opposing the bolted connection of an arcuate coupling segment of said first one of said series to an arcuate coupling segment of said second one of said series, wherein said interference relationship provides a separation gap between the bolt pads of juxtaposed coupling segments of said first and second ones of said series, preventing the bringing together of the bolt pads of juxtaposed coupling segments of said first and second series to their fully tightened condition, wherein each of said series of coupling segments includes two identical substantially semicircular arcuate coupling segments, the first and second members of the coupling segments of said first one of said series being reverse located with respect to the first and second members of said second one of said series, and wherein said first member being a projection and said second member being a recess configured to receive said projection, the location of said projection and recess in said second one of said series being the reverse of said first one of said series, such that if two coupling segments of the same one of said first or second series are in juxtaposition a projection of each coupling segment will enter a recess of the other coupling segment to permit close engagement therebetween, and if a coupling segment of said first series is in juxtaposition to a coupling segment of said second series their projections will abut to prevent close engagement therebetween.

4. In a series of successively sized segmented pipe couplings, each coupling adapted to securably connect the similarly configured and sized pipe ends of juxtaposed pipes;

each one of said series of segmented pipe couplings comprising two arcuate segments to be assembled in arcuate end-to-end relationship for encircling the juxtaposed ends of the pipes to be coupled;

each of said coupling segments including:

radially inwardly extending and axially spaced first and second keys, said first keys of the juxtaposed coupling segments being in circumferential alignment, and said second keys of the juxtaposed coupling segments being in circumferential alignment, each of said first and second keys being adapted to cooperatively engage a peripheral groove about the outer circumference of one of the juxtaposed pipe ends, and bolt receiving pads at the ends of each of said coupling segments for receiving bolts to securely maintain the individual coupling segments of each series about the juxtaposed pipe ends, with the tightening of said bolts bringing the bolt pads together to urge the individual coupling segments radially inward to produce a reduction in the internal circumference of the coupling and cause clamping engagement with the pipe exterior, with said keys being tightly retained within their respective pipe recesses when said bolts are in their fully tightened condition;

each one of said series having a different diameter and intended to couple together two pipes having the same pipe diameter;

each first segmented pipe coupling in a first one of said series having a first diameter and each second segmented pipe coupling in a second one of said series having a second diameter, said second segmented pipe couplings being the next successively sized couplings within said series after said first segmented pipe couplings, with said second diameter being greater than said first diameter, said first segmented pipe couplings being intended to couple together pipes having respective pipe diameters that are different from the respective pipe diameters of pipes that said segmented pipe couplings are intended to couple together, wherein said coupling segments in any one of said series are identical to each other and symmetric such that each bolt pad on any coupling segment in any one of said series is alignable into a fully bolt tightened connection with any bolt pad of any other coupling segment in that one of said series, the improvement comprising:

anti-mismatch means provided on the individual ones of said coupling segments for preventing the fully bolt tightened connection of a coupling segment of said first one of said series to a coupling segment of said second one of said series, said second diameter being only slightly greater than said first diameter, said anti-mismatch means being a projection on a first of said coupling segments in each of said series, and a recess on a second of said coupling segments of each of said series;

the projection and recess of said first one of said series configured and located to nest as their coupling segments are bolt tightened, such that the ends of said coupling segments are brought together in close proximity to encircle a pipe of a diameter corresponding to said first diameter;

the projection and recess of said second one of said series configured and located to nest as their coupling segments are bolt tightened, such that the ends of said coupling segments are brought together in close proximity to encircle a pipe of a diameter corresponding to said second diameter;

the orientation of said projection and recess of said first one of said series differing from the orientation of said projection and recess of said second one of said series such that said projections of their respective segmented pipe couplings abut and provide an interference relationship opposing the bolted connection of an arcuate coupling segment of said first one of said series to an arcuate coupling segment of said second one of said series, wherein each anti-mismatch means provided on the coupling segments of said first one of said series has a first structural symmetry and each anti-mismatch means provided on the coupling segments of said second one of said series has a second structural symmetry different from said first structural symmetry, such that any two of the coupling segments of said first one of said series will nest together with matching symmetries, any two of the coupling segments of said second one of said series will nest together with matching symmetries, but any coupling segment of said first one of said series is prevented from nesting with any coupling segment of said second one of said series by their different symmetries, wherein said interference relationship provides a separation gap between the bolt pads of juxtaposed coupling segments of said first and second ones of said series, preventing the bringing together of the bolt pads of juxtaposed coupling segments of said first and second series to their fully tightened condition.

5. In a series of successively sized segmented pipe couplings, each coupling adapted to securably connect the similarly configured and sized pipe ends of juxtaposed pipes;

each one of said series of segmented pipe couplings comprising two arcuate segments to be assembled in arcuate end-to-end relationship for encircling the juxtaposed ends of the pipes to be coupled;

each of said coupling segments including:

radially inwardly extending and axially spaced first and second keys, said first keys of the juxtaposed coupling segments being in circumferential alignment, and said second keys of the juxtaposed coupling segments being in circumferential alignment, each of said first and second keys being adapted to cooperatively engage a peripheral groove about the outer circumference of one of the juxtaposed pipe ends, and bolt receiving pads at the ends of each of said coupling segments for receiving bolts to securably maintain the individual coupling segments of each series about the juxtaposed pipe ends, with the tightening of said bolts bringing the bolt pads together to urge the individual coupling segments radially inward to produce a reduction in the internal circumference of the coupling and cause clamping engagement with the pipe exterior, with said keys being tightly retained within their respective pipe recesses when said bolts are in their fully tightened condition;

each one of said series having a different diameter and intended to couple together two pipes having the same pipe diameter;

each first segmented pipe coupling in a first one of said series having a first diameter and each second segmented pipe coupling in a second one of said series having a second diameter, said second segmented pipe couplings being the next successively sized couplings within said series after said first segmented pipe couplings, with said second diameter being greater than said first diameter, said first segmented pipe couplings being intended to couple together pipes having respective pipe diameters that are different from the respective pipe diameters of pipes that said second segmented pipe couplings are intended to couple together, wherein said coupling segments m any one of said series are identical to each other and symmetric such that each bolt pad on any coupling segment in any one of said series is alignable into a fully bolt tightened connection with any bolt pad of any other coupling segment in that one of said series, the improvement comprising:

anti-mismatch means provided on the individual ones of said coupling segments for preventing the fully bolt tightened connection of a coupling segment of said first one of said series to a coupling segment of said second one of said series, said second diameter being only slightly greater than said first diameter, said anti-mismatch means being a projection on a first of said coupling segments in each of said series, and a recess on a second of said coupling segments of each of said series;

wherein each anti-mismatch means provided on the coupling segments of said first one of said series has a first structural symmetry and each anti-mismatch means provided on the coupling segments of said second one of said series has a second structural symmetry different from said first structural symmetry, such that any two of the coupling segments of said first one of said series will nest together with matching symmetries, any two of the coupling segments of said second one of said series will nest together with matching symmetries, but any coupling segment of said first one of said series is prevented from nesting with any coupling segment of said second one of said series by their different symmetries, wherein the location of said projection and recess in said second one of said series being the reverse of said first one of said series, such that if the two coupling segments of the same one of said first or second series are in juxtaposition a projection of each coupling segment will enter a recess of the other coupling segment to permit close engagement therebetween, and if a coupling segment of said first series is in juxtaposition to a coupling segment of said second series their projections will abut to prevent close engagement therebetween.

6. In a series of successively sized segmented pipe couplings according to claim 5, wherein:

the projection and recess of said first one of said series configured and located to nest as their coupling segments are bolt tightened, such that the ends of said coupling segments are brought together in close proximity to encircle a pipe of a diameter corresponding to said first diameter; and the projection and recess of said second one of said series configured and located to nest as their coupling segments are bolt tightened, such that the ends of said coupling segments are brought together in close proximity to encircle a pipe of a diameter corresponding to said second diameter.

7. In a series of successively sized segmented pipe couplings according to claim 6, wherein the orientation of said projection and recess of said first one of said series differing from the orientation of said projection and recess of said second one of said series such that said projections of their respective segmented pipe couplings abut and provide an interference relationship.

8. In a series of successively sized segmented pipe couplings, each coupling adapted to securably connect similarly configured and sized pipes;
   each one of said series of segmented pipe couplings comprising at least two arcuate segments to be assembled in arcuate end-to-end relationship for encircling the portions of the pipes to be coupled;
   each of said coupling segments including;
      a radially inwardly extending portion adapted to engage the outer circumference of one of the pipes being connected, and
      bolt receiving pads at the ends of each said coupling segments for receiving bolts to securably maintain the individual coupling segments of each series about the pipes being connected, with the tightening of said bolts bringing the bolt pads together to urge the individual coupling segments radially inward to produce a reduction in the internal circumference of the coupling and cause clamping engagement with the pipe exterior;
   each one of said series having a different diameter and intended to couple together two pipes having the same pipe diameter;
   each first segmented pipe coupling in a first one of said series having a first diameter and each second segmented pipe coupling in a second one of said series having a second diameter, said second segmented pipe couplings being the next successively sized couplings within said series after said first segmented pipe couplings, with said second diameter being greater than said first diameter;
   said first segmented pipe couplings being intended to couple together pipes having respective pipe diameters that are different from the respective pipe diameters of pipes that said second segmented pipe couplings are intended to couple together,
   wherein said coupling segments in any one of said series are identical to each other and symmetric such that each bolt pad on any coupling segment in any one of said series is alignable into a fully bolt tightened connection with any bolt pad of any other coupling segment in that one of said series,
   the improvement comprising:
      anti-mismatch means provided on the individual ones of said coupling segments for preventing the fully bolt tightened connection of a coupling segment of said first one of said series to a coupling segment of said second one of said series, said second diameter being only slightly greater than said first diameter,
      wherein each anti-mismatch means provided on the coupling segments of said first one of said series has a first structural symmetry and each anti-mismatch means provided on the coupling segments of said second one of said series has a second structural symmetry different from said first structural symmetry, such that any two of the coupling segments of said first one of said series will nest together with matching symmetries, any two of the coupling segments of said second one of said series will nest together with matching symmetries, but any coupling segment of said first one of said series is prevented from nesting with any coupling segment of said second one of said series by their different symmetries,
      wherein said anti-mismatch means includes a first member on a first of said coupling segments in each of said series, and a second member on a second of said coupling segments of each of said series;
      the first and second members of said first one of said series of segmented pipe couplings configured and located to nest as their coupling segments are bolt tightened,
      the first and second members of said second ones of said series of pipe couplings configured and located to nest as their coupling segments are bolt tightened,
      the orientation of said first and second members of said first one of said series of segmented pipe couplings differing from the orientation of said first and second members of said second one of said series, such that said first and second members of their respective segmented pipe couplings provide an interference relationship opposing the bolted connection of an arcuate coupling segment of said first one of said series to an arcuate coupling segment of said second one of said series, wherein said interference relationship provides a separation gap between the bolt pads of juxtaposed coupling segments of said first and second ones of said series, preventing the bringing together of the bolt pads of juxtaposed coupling segments of said first and second series to their fully tightened condition,
      wherein each of said series of coupling segments includes two identical substantially semicircular arcuate coupling segments, the first and second members of the coupling segments of said first one of said series being reverse located with respect to the first and second members of said second one of said series.

9. In a series of successively sized segmented pipe couplings according to claim 8, wherein said first member being a projection and said second member being a recess configured to receive said projection, the location of said projection and recess in said second one of said series being the reverse of said first one of said series, such that if two coupling segments of the same one of said first or second series are in juxtaposition a projection of each coupling segment will enter a recess of the other coupling segment to permit close engagement therebetween, and if a coupling segment of said first series is in juxtaposition to a coupling segment of said second series their projections will abut to prevent close engagement therebetween.

10. In a series of successively sized segmented pipe couplings according to claim 9, wherein said interference relationship provides a separation gap between the bolt pads of juxtaposed coupling segments of said first and second ones of said series, preventing the bringing together of the bolt pads of juxtaposed coupling segments of said first and second series to their fully tightened condition.

11. In a series of successively sized segmented pipe couplings, each coupling adapted to securably connect similarly configured and sized pipes;
   each one of said series of segmented pipe couplings comprising at least two arcuate segments to be assembled in arcuate end-to-end relationship for encircling the portions of the pipes to be coupled;
   each of said coupling segments including:

a radially inwardly extending portion adapted to engage the outer circumference of one of the pipes being connected, and bolt receiving pads at the ends of each of said coupling segments for receiving bolts to securely maintain the individual coupling segments of each series about the pipes being connected, with the tightening of said bolts bringing the bolt pads together to urge the individual coupling segments radially inward to produce a reduction in the internal circumference of the coupling and cause clamping engagement with the pipe exterior;

each one of said series having a different diameter and intended to couple together two pipes having the same pipe diameter;

each first segmented pipe coupling in a first one of said series having a first diameter and each second segmented pipe coupling in a second one of said series having a second diameter, said second segmented pipe couplings being the next successively sized couplings within said series after said first segmented pipe couplings, with said second diameter being greater than said first diameter, said first segmented pipe couplings being intended to couple together pipes having respective pipe diameters that are different from the respective pipe diameters of pipes that said second segmented pipe couplings are intended to couple together, wherein said coupling segments in any one of said series are identical to each other and symmetric such that each bolt pad on any coupling segment in any one of said series is alignable into a fully bolt tightened connection with any bolt pad of any other coupling segment in that one of said series, the improvement comprising:

anti-mismatch means provided on the individual ones of said coupling segments for preventing the fully bolt tightened connection of a coupling segment of said first one of said series to a coupling segment of said second one of said series, said second diameter being only slightly greater than said first diameter, wherein each anti-mismatch means provided on the coupling segments of said first one of said series has a first structural symmetry and each anti-mismatch means provided on the coupling segments of said second one of said series has a second structural symmetry different from said first structural symmetry, such that any two of the coupling segments of said first one of said series will nest together with matching symmetries, any two of the coupling segments of said second one of said series will nest together with matching symmetries, but any coupling segment of said first one of said series is prevented from nesting with any coupling segment of said second one of said series by their different symmetries, wherein said anti-mismatch means includes a first member on a first of said coupling segments in each said series, and a second member on a second of said coupling segments of each of said series;

the first and second members of said first one of said series of segmented pipe couplings configured and located to nest as their coupling segments are bolt tightened, such that the ends of said coupling segments are brought together in close proximity to encircle a pipe of a diameter corresponding to said first diameter;

the first and second members of said second ones of said series of pipe couplings configured and located to nest as their coupling segments are bolt tightened, such that the ends of said coupling segments are brought together in close proximity to encircle a pipe of a diameter corresponding to said second diameter;

the orientation of said first and second members of said first one of said series of segmented pipe couplings differing from the orientation of said first and second members of said second one of said series such that said first and second members of their respective segmented pipe couplings provide an interference relationship opposing the bolted connection of an arcuate coupling segment of said first one of said series to an arcuate coupling segment of said second one of said series, wherein said first member being a projection and said second member being a recess configured to receive said projection, the location of said projection and recess in said second one of said series being the reverse of said first one of said series, such that if two coupling segments of the same one of said first or second series are in juxtaposition a projection of each coupling segment will enter a recess of the other coupling segment to permit close engagement therebetween, and if a coupling segment of said first series is in juxtaposition to a coupling segment of said second series their projections will abut to prevent close engagement therebetween.

12. In a series of successively sized segmented pipe couplings according to claim 11, wherein said interference relationship provides a separation gap between the bolt pads of juxtaposed coupling segments of said first and second ones of said series, preventing the bringing together of the bolt pads of juxtaposed coupling segments of said first and second series to their fully tightened condition.

13. In a series of successively sized segmented pipe couplings, each coupling adapted to securably connect the similarly configured and sized pipe ends of juxtaposed pipes;

each one of said series of segmented pipe couplings comprising at least two arcuate segments to be assembled in arcuate end-to-end relationship for encircling the juxtaposed ends of the pipes to be coupled;

each of said coupling segments including:

radially inwardly extending and axially spaced first and second keys, said first keys of the juxtaposed coupling segments being in circumferential alignment, and said second keys of the juxtaposed coupling segments being in circumferential alignment, each of said first and second keys being adapted to cooperatively engage a peripheral groove about the outer circumference of one of the juxtaposed pipe ends, and bolt receiving pads at the ends of each of said coupling segments for receiving bolts to securably maintain the individual coupling segments of each series about the juxtaposed pipe ends, with the tightening of said bolts bringing the bolt pads together to urge the individual coupling segments radially inward to produce a reduction in the internal circumference of the coupling and cause clamping engagement with the pipe exterior, with said keys being tightly retained within their respective pipe recesses when said bolts are in their fully tightened condition;

each one of said series having a different diameter and intended to couple together two pipes having the same pipe diameter;

each first segmented pipe coupling in a first one of said series having a first diameter and each second segmented pipe coupling in a second one of said series having a second diameter, said second segmented pipe couplings being the next successively sized couplings within said series after said first segmented pipe couplings, with said second diameter being greater than said first diameter;

said first segmented pipe couplings being intended to couple together pipes having respective pipe diameters that are different from the respective pipe diameters of pipes that said second segmented pipe couplings are intended to couple together, wherein said coupling segments m any one of said series are identical to each other and symmetric such that each bolt pad on any coupling segment in any one of said series is alignable into a fully bolt tightened connection with any bolt pad of any other coupling segment in that one of said series, the improvement comprising:

anti-mismatch means provided on the individual ones of said coupling segments for preventing the fully bolt tightened connection of a coupling segment of said first one of said series to a coupling segment of said second one of said series, said second diameter being only slightly greater than said first diameter, wherein each anti-mismatch means provided on the coupling segments of said first one of said series has a first structural symmetry and each anti-mismatch means provided on the coupling segments of said second one of said series has a second structural symmetry different from said first structural symmetry, such that any two of the coupling segments of said first one of said series will nest together with matching symmetries, any two of the coupling segments of said second one of said series will nest together with matching symmetries, but any coupling segment of said first one of said series is prevented from nesting with any coupling segment of said second one of said series by their different symmetries, wherein said anti-mismatch means includes a first member on a first of said coupling segments in each of said series, and a second member on a second of said coupling segments of each of said series, the first and second members of said first one of said series of segmented pipe couplings configured and located to nest as their coupling segments are bolt tightened, such that the ends of said coupling segments are brought together in close proximity to encircle a pipe of a diameter corresponding to said first diameter, the first and second of said second ones of said series of segmented pipe couplings configured and located to nest as their coupling segments are bolt tightened, such that the ends of said coupling segments are brought together in close proximity to encircle a pipe of a diameter corresponding to said second diameter, he orientation of said first and second members of said first one of said series of segmented pipe couplings differing from the orientation of said first and second members of said second one of said series, such that said first and second members of their respective segmented pipe couplings provide an interference relationship opposing the bolted connection of an arcuate coupling segment of said first one of said series to an arcuate coupling segment of said second one of said series, wherein each of said series of coupling segments includes two identical substantially semicircular arcuate coupling segments, the first and second members of the coupling segments of said first one of said series being reverse located with respect to the first and second members of said second one of said series, and wherein said first member being a projection and said second member being a recess configured to receive said projection, the location of said projection and recess in said second one of said series being the reverse of said first one of said series, such that if two coupling segments of the same one of said first or second series are in juxtaposition a projection of each coupling segment will enter a recess of the other coupling segment to permit close engagement therebetween, and if a coupling segment of said first series is in juxtaposition to a coupling segment of said second series their projections will abut to prevent close engagement therebetween.

* * * * *